(12) United States Patent
Hofström et al.

(10) Patent No.: US 12,133,224 B2
(45) Date of Patent: Oct. 29, 2024

(54) NETWORK NODE, UE AND METHODS PERFORMED THEREIN FOR HANDLING COMMUNICATION

(71) Applicant: Telefonaktiebolaget LM Ericsson (publ), Stockholm (SE)

(72) Inventors: Björn Hofström, Linköping (SE); Helka-Liina Määttanen, Helsinki (FI); Jinhua Liu, Beijing (CN); Min Wang, Luleå (SE); Jonas Sedin, Sollentuna (SE); Xingqin Lin, Santa Clara, CA (US); Siva Muruganathan, Stittsville (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 319 days.

(21) Appl. No.: 17/424,263

(22) PCT Filed: Feb. 10, 2020

(86) PCT No.: PCT/SE2020/050129
§ 371 (c)(1),
(2) Date: Jul. 20, 2021

(87) PCT Pub. No.: WO2020/167215
PCT Pub. Date: Aug. 20, 2020

(65) Prior Publication Data
US 2022/0070907 A1    Mar. 3, 2022

Related U.S. Application Data

(60) Provisional application No. 62/805,328, filed on Feb. 14, 2019.

(51) Int. Cl.
*H04W 72/21* (2023.01)
*H04W 28/02* (2009.01)

(52) U.S. Cl.
CPC ....... *H04W 72/21* (2023.01); *H04W 28/0278* (2013.01)

(58) Field of Classification Search
CPC ... H04W 72/21; H04W 72/20; H04W 72/512; H04W 28/0278
See application file for complete search history.

(56) References Cited

U.S. PATENT DOCUMENTS

2013/0028201 A1* 1/2013 Koo ................ H04W 72/1215
370/329
2018/0132268 A1* 5/2018 Zhang ................ H04W 72/21
(Continued)

FOREIGN PATENT DOCUMENTS

CN     108886798 A    11/2018
WO    2016204713 A1   12/2016

OTHER PUBLICATIONS

International Search Report and Written Opinion dated Apr. 24, 2020 for International Application No. PCT/SE2020/050129 filed Feb. 10, 2020, consisting of 11-pages.
(Continued)

*Primary Examiner* — Sudesh M Patidar
(74) *Attorney, Agent, or Firm* — Weisberg I.P. Law, P.A.

(57) ABSTRACT

Embodiments herein relate to, e.g., a method performed by a UE for handling communication of data in a wireless communication network. The UE transmits a scheduling request, SR, indicating a buffer status of the UE or along with an indication indicating the buffer status of the UE.

13 Claims, 14 Drawing Sheets

(56) References Cited

U.S. PATENT DOCUMENTS

2018/0152950 A1* 5/2018 Xiong ............... H04W 72/0446
2019/0053266 A1* 2/2019 Jiang ................. H04L 27/2607

OTHER PUBLICATIONS

3GPP TR 38.811 V15.4.0; 3rd Generation Partnership Project; Technical Specification Group Radio Access Network; Study on New Radio (NR) to support non-terrestrial networks (Release 15), Sep. 2020, consisting of 127-pages.

3GPP TSG-RAN WG2 Meeting #91 R2-153416; Title: Combined SR with BSR for reducing UP latency; Agenda Item: 7.11; Source: Institute for Information Industry (III); Document for: Discussion; Date and Location: Aug. 24-28, 2015, Beijing, China, consisting of 4-pages.

3GPP TS 38.211 V15.3.0; 3rd Generation Partnership Project; Technical Specification Group Radio Access Network; NR; Physical channels and modulation (Release 15), Sep. 2018, consisting of 96-pages.

3GPP TSG RAN meeting #80 RP-181370; Title: Study on solutions evaluation for NR to support Non Terrestrial Network; Type: SID new; Agenda Item: 9.1.17—Study on solutions evaluation for NR to support Non Terrestrial Network, moderator: Thales; Source: Thales; Document for: Approval; Date and Location: Jun. 11-14, 2018, La Jolla, USA, consisting of 14-pages.

3GPP TR 38.811 V15.0.0; 3rd Generation Partnership Project; Technical Specification Group Radio Access Network; Study on New Radio (NR) to support non-terrestrial networks (Release 15), Jun. 2018, consisting of 118-pages.

Chinese Office Action with English machine translation dated Mar. 12, 2024 for Patent Application No. 202080014591.1, consisting of 16-pages.

* cited by examiner

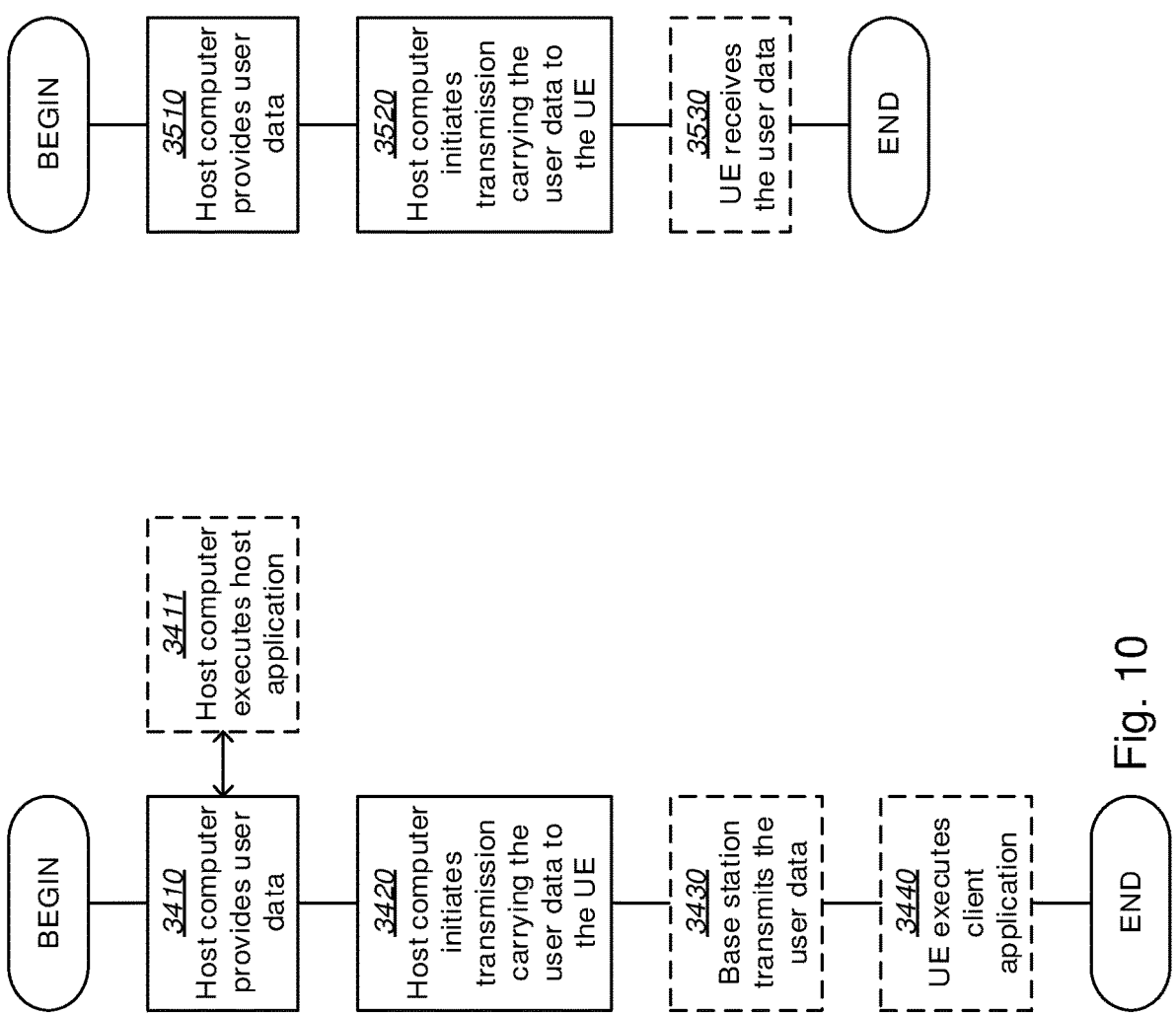

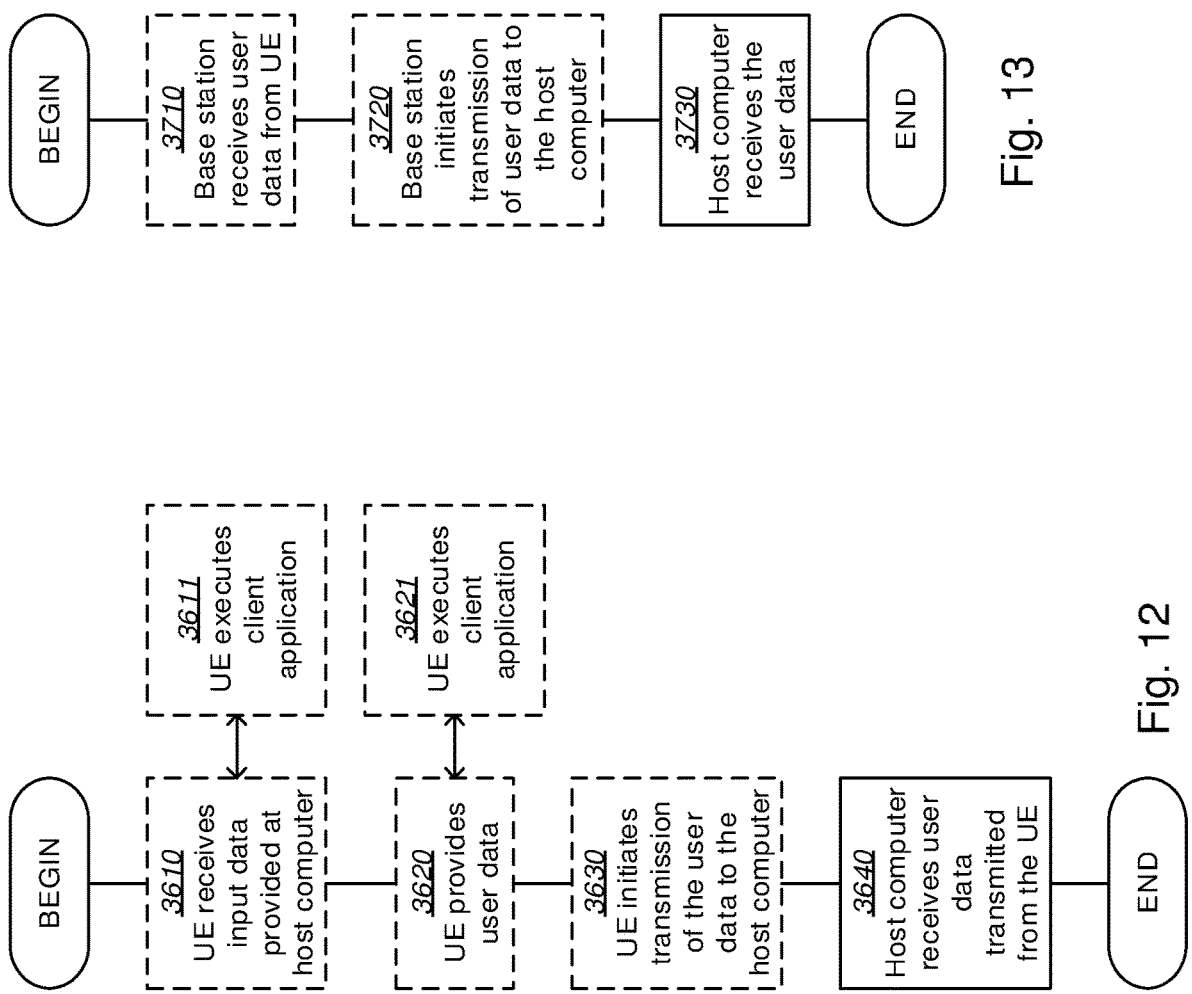

NETWORK NODE, UE AND METHODS PERFORMED THEREIN FOR HANDLING COMMUNICATION

CROSS-REFERENCE TO RELATED APPLICATIONS

This application is a Submission Under 35 U.S.C. § 371 for U.S. National Stage Patent Application of International Application No. PCT/SE2020/050129, filed Feb. 10, 2020 entitled "NETWORK NODE, UE AND METHODS PERFORMED THEREIN FOR HANDLING COMMUNICATION," which claims priority to U. S. Provisional Application No.: 62/805,328, filed Feb. 14, 2019, the entireties of both of which are incorporated herein by reference.

TECHNICAL FIELD

Embodiments herein relate to a network node, a user equipment (UE) and methods performed therein for communication. Furthermore, a computer program product and a computer readable storage medium are also provided herein. In particular, embodiments herein relate to handling communication, such as managing or reporting buffer status of the UE, within a wireless communication network.

BACKGROUND

In a typical wireless communication network, User equipments (UE), also known as wireless communication devices, mobile stations, stations (STA) and/or wireless devices, communicate via a Radio Access Network (RAN) to one or more core networks (CN). The RAN covers a geographical area which is divided into service areas or cells, with each service area or cell being served by a radio network node such as a radio access node e.g., a Wi-Fi access point or a radio base station (RBS), which in some networks may also be denoted, for example, a NodeB, an eNodeB, or a gNodeB. A service area or cell is a geographical area where radio coverage is provided by the radio network node. The radio network node communicates over an air interface operating on radio frequencies with the UE within range of the radio network node. The communication is carried out in downlink (DL) and uplink (UL) directions.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

With the emerging 5G technologies such as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

There is further an ongoing resurgence of satellite communications being an example of wireless communication. Several plans for satellite networks have been announced in the past few years. The target services vary, from backhaul and fixed wireless, to transportation, to outdoor mobile, to internet of things (IoT). Satellite networks could complement mobile networks on the ground by providing connectivity to underserved areas and multicast and/or broadcast services.

To benefit from the strong mobile ecosystem and economy of scale, adapting the terrestrial wireless access technologies including LTE and NR for satellite networks is drawing significant interest. For example, 3GPP completed an initial study in Release (Rel) 15 on adapting NR to support non-terrestrial networks, mainly satellite networks [1]. This initial study focused on a channel model for the non-terrestrial networks, defining deployment scenarios, and identifying the key potential impacts. 3GPP is conducting a follow-up study item in Release 16 on solutions evaluation for NR to support non-terrestrial networks [2].

Satellite Communications

A satellite radio access network usually includes the following components:
  Gateway that connects satellite network to core network
  Satellite that refers to a space-borne platform
  Terminal that refers to user equipment
  Feeder link that refers to the link between a gateway and a satellite
  Service link that refers to the link between a satellite and a terminal Depending on the orbit altitude, a satellite may be categorized as Medium Earth Orbit (MEO), Geostationary Earth Orbit (GEO) or Low Earth Orbit (LEO) satellite.
  LEO: typical heights ranging from 500-1,500 km, with orbital periods ranging from 90-140 minutes, wherein the orbital period is the time a given astronomical object takes to complete one orbit around another object.

MEO: typical heights ranging from 5,000-25,000 km, with orbital periods ranging from 2-14 hours.

GEO: height at 35,786 km, with an orbital period of 24 hours.

Propagation Delays.

Propagation delay is a main physical phenomenon in a satellite communication system that makes the design different from that of a terrestrial mobile system. For a bent pipe satellite network, the following delays are relevant.

One-way delay: from the radio network node to the UE via the satellite, or the other way around Round-trip delay: from the radio network node to the UE via the satellite and from the UE back to the radio network node via the satellite Differential delay: the delay difference of two selected points in the same spotbeam.

The following Tables 1 and 2 are taken from 3GPP TR 38.811 v15.0.0 [1]. We can see that the round-trip delay is much larger in satellite systems. For example, it is about 545 ms for a GEO satellite system. In contrast, the round-trip time is normally no more than 1 ms for typical terrestrial cellular networks.

TABLE 1

Propagation delays for GEO satellite at 35,786 km (extracted from Table 5.3.2.1-1 in 3GPP TR 38.811 v. 15.0.0 [1])

| | GEO at 35786 km | | |
|---|---|---|---|
| Elevation angle | Path | D (km) | Time (ms) |
| UE: 10° | satellite-UE | 40586 | 135.286 |
| GW: 5° | satellite-gateway | 41126.6 | 137.088 |
| 90° | satellite-UE | 35786 | 119.286 |
| | Bent Pipe satellite | | |
| One way delay | Gateway-satellite_UE | 81712.6 | 272.375 |
| Round trip Time | Twice | 163425.3 | 544.751 |
| | Regenerative Satellite | | |
| One way delay | Satellite-UE | 40586 | 135.286 |
| Round Trip Time | Satellite-UE-Satellite | 81172 | 270.572 |

TABLE 2

Propagation delays for NGSO satellites (extracted from Table 5.3.4.1-1 in 3GPP TR 38.811 [1])

| | | LEO at 600 km | | LEO at 1500 km | | MEO at 10000 km | |
|---|---|---|---|---|---|---|---|
| Elevation angle | Path | Distance D (km) | Delay (ms) | Distance D (km) | Delay (ms) | Distance D (km) | Delay (ms) |
| UE: 10° | satellite-UE | 1932.24 | 6,440 | 3647.5 | 12,158 | 14018.16 | 46.727 |
| GW: 5° | satellite-gateway | 2329.01 | 7.763 | 4101.6 | 13.672 | 14539.4 | 48.464 |
| 90° | satellite-UE | 600 | 2 | 1500 | 5 | 10000 | 33.333 |
| | Bent pipe satellite | | | | | | |
| One way delay | Gateway-satellite UE | 4261.2 | 14.204 | 7749.2 | 25.83 | 28557.6 | 95.192 |
| Round Trip Delay | Twice | 8522.5 | 28.408 | 15498.4 | 51.661 | 57115.2 | 190.38 |
| | Regenerative satellite | | | | | | |
| One way delay | Satellite-UE | 1932.24 | 6.44 | 3647.5 | 12.16 | 14018.16 | 46.73 |
| Round Trip Delay | Satellite-UE-Satellite | 3864.48 | 12.88 | 7295 | 24.32 | 28036.32 | 93.45 |

The objectives of the current system information (SI) are to evaluate solutions for the identified key impacts from the preceding SI and to study impact on RAN protocols/architecture. The objectives for layer 2 and above are:

Study the following aspects and identify related solutions if needed: Propagation delay: Identify timing requirements and solutions on layer 2 aspects, Medium access control (MAC), radio link control (RLC), radio resource control (RRC), to support non-terrestrial network propagation delays considering frequency division duplex (FDD) and time division duplex (TDD) duplexing mode. This includes radio link management. [RAN2]

Handover: Study and identify mobility requirements and necessary measurements that may be needed for handovers between some non-terrestrial space-borne vehicles (such as Non Geo stationary satellites) that move at much higher speed but over predictable paths [RAN2, RAN1]

Architecture: Identify needs for the 5G's Radio Access Network architecture to support non-terrestrial networks (e.g. handling of network identities) [RAN3]

Paging: procedure adaptations in case of moving satellite foot prints or cells Note:

This new study item does not address regulatory issues.

Physical Uplink Control Channel (PUCCH) is used to carry uplink control information (UCI) such as hybrid automatic repeat request (HARQ) feedback, channel state information (CSI), and scheduling request (SR).

Unlike LTE PUCCHs that are located at the edges of the carrier bandwidth, NR PUCCHs are restricted within a UE bandwidth part (BWP) to allow the support of UE with smaller bandwidth capabilities in an NR carrier. The design of NR PUCCHs is flexible, including short PUCCH using 1 or 2 orthogonal frequency division multiplexing (OFDM) symbols and long PUCCH using 4 to 14 OFDM symbols.

PUCCH format 0 uses 1 or 2 OFDM symbols to carry 1 or 2 bits UCI. The UCI is represented by the selection of length-12 sequences that are consecutively mapped to one resource block (RB). UCI of different UEs may be multiplexed on the same time-frequency resources.

PUCCH format 1 uses 4 to 14 OFDM symbols to carry 1 or 2 bits UCI. The UCI is first mapped to a binary phase shift keying (BPSK) or quadrature phase shift keying (QPSK) symbol, and the OFDM symbol is then multiplied by a sequence of length 12 mapped to one RB and weighted with an orthogonal cover code (OCC) in time. UCI of different UEs may be multiplexed on the same time-frequency resources.

PUCCH format 2 uses 1 or 2 OFDM symbols to carry more than 2 bits UCI. The UCI is encoded with Reed-Muller codes if the payload is smaller than or equal to 11 bits and with Polar codes otherwise. The coded bits are scrambled and modulated with QPSK. The number of contiguous RBs used for transmission can be up to 16.

PUCCH format 3 uses 4 to 14 OFDM symbols to carry more than 2 bits UCI. The UCI is similarly encoded, scrambled, and modulated as in PUCCH format 2, with an additional option of using Pi/2 BPSK. The symbols are then discrete fourier transform (DFT) precoded and mapped to up to 16 contiguous RBs.

PUCCH format 4 uses 4 to 14 OFDM symbols to carry more than 2 bits UCI. This format is similar to PUCCH format 3 except that it only uses one RB and the pre-DFT symbols are weighted with different OCCs.

The above PUCCH formats can be configured with frequency hopping to reap frequency diversity gain. For the long PUCCH formats 1, 3, and 4, UCI may be repeated over up to 8 slots to reap power gain and time diversity gain.

In Rel-15, a UE may be configured with up to 4 PUCCH resource sets per BWP. In a PUCCH resource set, a maximum number of PUCCH resource indexes is provided. The maximum number of PUCCH resources in the first PUCCH resource set is 32 and the maximum number of PUCCH resources in the other PUCCH resource sets is 8. Each PUCCH resource configuration includes the format to use and the associated parameters.

Each resource set corresponds to a range of UCI size. For the first PUCCH resource set, the maximum number of UCI information bits is 2. In a PUCCH occurrence, the UE chooses the first of its PUCCH resource sets which supports the number of bits that the UE wants to transmit. A 3-bit field in downlink control information (DCI) format 1_0/1_1, possibly with an implicit rule for a resource set with more than 8 PUCCH configurations, indicates which of the PUCCH resource configurations in the PUCCH resource set, determined by UCI size, to use. For semi-statically configured periodic CSI and SR, additional higher layer parameters are provided to determine the periodic CSI and SR opportunities.

Acquiring Uplink Resources.

When new data arrive in the UE's uplink buffer it may trigger a buffer status report (BSR) to be sent to the network. If the UE at that point does not have any uplink resources to communicate with the network, it may have been configured with SR resources on the Physical Uplink Control Channel (PUCCH) to be used to indicate its need of a grant. The SR resources are unique for the UE and are repeated over time with a certain periodicity.

If an SR is sent using the dedicated PUCCH resources, the network detects the presence of the signal and then knows which UE that is requiring UL resources. The network can then grant the UE with UL resources on PUSCH by sending a downlink control information (DCI) to the UE using the physical downlink control channel (PDCCH). The UE then sends its BSR to inform the network of its current buffer status and expects further grants accordingly.

Low-Peak-to-Average Power Ratio (PAPR) Sequence in NR

In 3GPP TS 38.211 v.15.3.0, a low-PAPR sequence is defined by a cyclic shift of a base sequence. The sequence $r_{u,v}^{(\alpha,\delta)}(n)$ is given by:

$$r_{u,v}^{(\alpha,\delta)}(n) = e^{j\alpha n}\bar{r}_{u,v}(n), 0 \le n < M_{ZC}$$

Where $M_{ZC}=mN_{sc}^{RB}/2^\delta$ is the length of the sequence, and m is an integer. The cyclic shift is given by $\bar{r}_{u,v}(n)$. Different sequences can be defined from a single base sequence by using different values of $\alpha$ and $\delta$.

Base sequences given by $\bar{r}_{u,v}(n)$ are divided into 30 different groups with the group number given by $u \in \{0, 1, \ldots, 29\}$. The index v denotes the base sequence number within the group. Each group may contain the following:

One base sequence (v=0) each with length $M_{ZC}=mN_{sc}^{RB}/2^\delta$, $1/2 \le m/2^\delta \le 5$ Two base sequences (v=0.1) each of length $M_{ZC}=mN_{sc}^{RB}/2^\delta$, $6 \le m/2^\delta$ The sequences $r_{u,v}^{(\alpha,\delta)}(n)$ with $\delta=0$ are used for PUCCH formats 0, 1, 3, and 4 in NR Rel-15. The higher layer parameter pucch-GroupHopping determines how the sequence group $u=(f_{gh}+f_{ss})\bmod 30$ and sequence number v within the group are selected. How these two parameters are selected is defined in clause 6.3.2.2.1 of 3GPP TS 38.211 v15.3.0. We recite parts of this clause below:

"—if pucch-GroupHopping equals 'neither'
$f_{gh}=0$
$f_{ss}=n_{ID}\bmod 30$
where $n_{ID}$ is given by the higher-layer parameter hoppingId if configured, otherwise $n_{ID}=N_{ID}^{cell}$.
if pucch-GroupHopping equals 'enable'

$$f_{gh} = \left(\sum_{m=0}^{7} 2^m c(8(2n_{s,f}^\mu + n_{hop})+m)\right) \bmod 30$$

$f_{ss} = n_{ID} \bmod 30$ $v = 0$ where the pseudo-random sequence (i) is defined by clause 5.2.1 of TS 38.211 and shall be initialized at the beginning of each radio frame with $c_{init}=\lfloor n_{ID}/30 \rfloor$ where $n_{ID}$ is given by the higher-layer parameter hoppingId if configured, otherwise $n_{ID}=N_{ID}^{cell}$.
if pucch-GroupHopping equals 'disable'
$f_{gh}=0$
$f_{ss}=n_{ID} \bmod 30$
$v=c(2n_{s,f}^\mu+n_{hop})$
where the pseudo-random sequence c(i) is defined by clause 5.2.1 of TS 38.211 and shall be initialized at the beginning of each radio frame with $c_{init}=2^5\lfloor n_{ID}/30 \rfloor+(n_{ID} \bmod 30)$ where $n_{ID}$ is given by the higher-layer parameter hoppingId if configured, otherwise $n_{ID}=N_{ID}^{cell}$."

Existing BSR procedure has been designed for terrestrial networks where the round-trip and/or propagation delay is restricted to be within a few milliseconds. For UEs in cells experiencing longer delays, e.g. as such in a satellite communication system, the propagation delay will prolong the closed loop of informing the network of the UE's current buffer status.

A UE connected to a non-terrestrial network (NTN), e.g. a GEO satellite, may experience a RTT around 550 ms which will delay the data transmission several round trip times (RTT) before a suitable sized grant is received.

SUMMARY

FIG. 1 shows one example of the various delays associated with data transmissions:

1. The SR reaches the network after a propagation delay Tp.

2. The network sends the response grant after a processing/slot delay T1.
3. The grant reaches the UE after another propagation delay Tp.
4. The roundtrip delay (RTD) is (2Tp+T1).
5. The UE sends the BSR after a processing/slot delay T2~=T1.
6. After two times the propagation delay plus processing delay, the UE receives the requested grant with at total delay of ~(4Tp+4T1).

Thus, issues with the existing BSR process for cells with large propagation delays may be that the existing BSR framework may suffer from large propagation delays such that the reports may be outdated or invalid by the time they reach the receiver. Furthermore, the long delay before the network receives the BSR may force the network to utilize sub-optimal scheduling that may cause a degraded end user experience with reduced bitrates and service degradations or reduce the resource efficiency.

In short, the BSR framework is ill-suited to some wireless communication networks, e.g. non-terrestrial networks, with large propagation delays.

An object of embodiments herein is to provide a mechanism for improving performance, such as reduce the delay, of the communication in an efficient manner.

According to an aspect the object may be achieved by a method performed by a UE for handling communication of data in a wireless communication network. The UE transmits, to a network node, an SR indicating a buffer status of the UE or along with an indication indicating the buffer status of the UE e.g. the SR may indicate the buffer status by itself e.g. using certain time and/or frequencies, or the SR may comprise one or more bits indicating buffer status such as level of buffer.

According to another aspect the object may be achieved by a method performed by a network node for handling communication of data of a UE in a wireless communication network. The network node receives, from the UE, an SR indicating a buffer status of the UE or along with an indication indicating the buffer status of the UE, e.g. the SR may indicate the buffer status by itself or the SR may comprise one or more bits indicating buffer status such as level of buffer. The network node further handles communication e.g. grants resources based on the SR and the indicated buffer status.

According to yet another aspect of embodiments herein, the object is achieved by providing a UE for handling communication of data in a wireless communication network. The UE is configured to transmit, to a network node, an SR indicating a buffer status of the UE or along with an indication indicating the buffer status of the UE e.g. the SR may indicate the buffer status by itself or the SR may comprise one or more bits indicating buffer status such as level of buffer.

According to still another aspect of embodiments herein, the object is achieved by providing a network node for handling communication of data of a UE in a wireless communication network. The network node is configured to receive, from the UE, an SR indicating a buffer status of the UE or along with an indication indicating the buffer status of the UE, e.g. the SR may indicate the buffer status by itself or the SR may comprise one or more bits indicating buffer status such as a level of buffer. The network node further handles communication e.g. grants and/or allocates resources, based on the SR and the indicated buffer status.

It is furthermore provided herein a computer program product comprising instructions, which, when executed on at least one processor, cause the at least one processor to carry out any of the methods above, as performed by the network node or the UE, respectively. It is additionally provided herein a computer-readable storage medium, having stored thereon a computer program product comprising instructions which, when executed on at least one processor, cause the at least one processor to carry out the method according to any of the methods above, as performed by the network node or the UE, respectively.

Embodiments herein introduce methods enabling the UE to indicate the buffer status via SR transmission to the network node before the BSR with detailed buffer status information can be received by the network node. Based on the buffer status derived from the SR of the UE, the network node can e.g. allocate uplink grant for the UE accordingly.

Embodiments reduce the delay and increase the resource efficiency of the scheduler by indicating buffer status as early as possible. Thus, embodiments herein enable the network node to grant resources in an efficient manner resulting in a communication with reduced delay which leads to an improved performance of the wireless communication network.

BRIEF DESCRIPTION OF THE DRAWINGS

Embodiments will now be described in more detail in relation to the enclosed drawings, in which:

FIG. 10 shows methods implemented in a communication system including a host computer, a base station and a user equipment in accordance with some embodiments;

FIG. 11 shows methods implemented in a communication system including a host computer, a base station and a user equipment in accordance with some embodiments;

FIG. 12 shows methods implemented in a communication system including a host computer, a base station and a user equipment in accordance with some embodiments; and FIG. 13 shows methods implemented in a communication system including a host computer, a base station and a user equipment in accordance with some embodiments.

DETAILED DESCRIPTION

Figure 1:
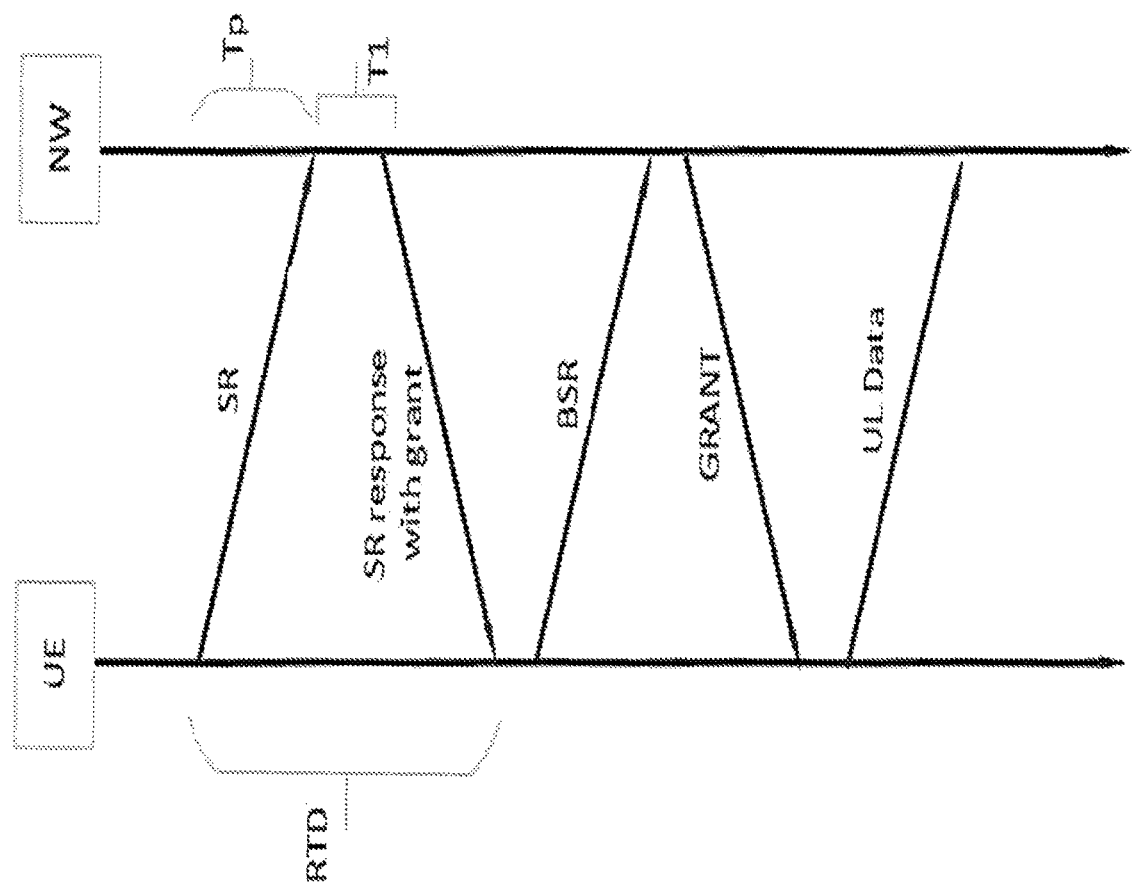
FIG. 1 is a signalling scheme according to prior art.
Figure 2:
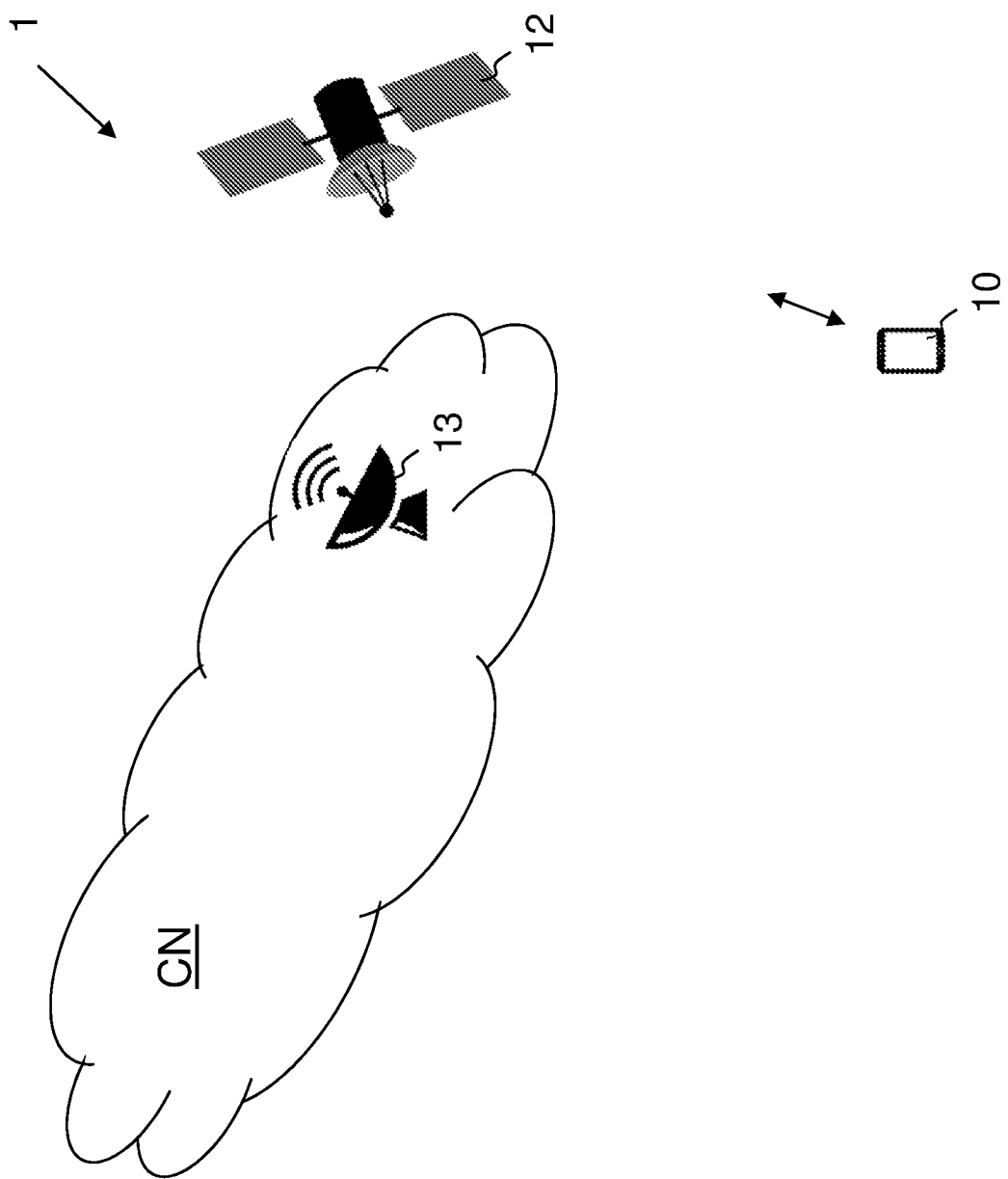
FIG. 2 is a schematic overview depicting a communication network according to embodiments herein.

Embodiments herein relate to communication networks in general. FIG. 2 is a schematic overview depicting a wireless communication network 1. The wireless communication network 1 comprises one or more RANs e.g. a first RAN (RAN1), connected to one or more CNs. The wireless communication network 1 may use a number of different technologies, such as New radio (NR), Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations.

In the wireless communication network 1, UEs e.g. a UE 10 such as a mobile station, a non-access point (non-AP) station (STA), a STA, a wireless device and/or a wireless terminal, are connected via the one or more RANs, to the one or more CNs. It should be understood by those skilled in the art that "UE" is a non-limiting term which means any terminal, wireless communication terminal, user equipment, Machine Type Communication (MTC) device, Internet of Things (IOT) operable device, Device to Device (D2D) terminal, mobile device e.g. smart phone, laptop, mobile phone, sensor, relay, mobile tablets or any device communicating within a cell or service area.

The wireless communication network 1 comprises a network node 12 providing radio coverage over a geographical area, a service area or a cell, of a first radio access technology (RAT), such as Satellite communication, New Radio (NR), LTE, UMTS, Wi-Fi and/or similar. The network node 12 may be a satellite, a radio access network node or radio network node such as radio network controller or an access point such as a wireless local area network (WLAN) access point or an Access Point Station (AP STA), an access controller, a base station, e.g. a radio base station such as a NodeB, an evolved Node B (eNB, eNodeB), a gNodeB, a base transceiver station, Access Point Base Station, base station router, a transmission arrangement of a radio base station, a stand-alone access point or any other network unit capable of serving a UE within the service area served by the network node 12 depending e.g. on the first radio access technology and terminology used. The network node 12 may be referred to as a serving node providing a serving cell.

The network node 12 e.g. a satellite may communicate with a gateway 13 in the core network.

The UE 10 transmits a scheduling request to the network node 12 and to reduce the delay, upon receiving an SR, the network node 12 may give a large UL grant to accommodate both BSR and UL data. However, it is difficult for the network node to dimension the UL grant right without any knowledge about the UE's buffer status.

According to embodiments herein the UE 10 indicates a buffer status along with the scheduling request. The network node 12 may then allocate resources for the UE 10 based on the SR and indicated buffer status.

Embodiments herein allow a decreased delay and for an optimized scheduling related to the size of the resources allocated to the UE 10 and indicated in the grant from the network node 12.

Figure 3:
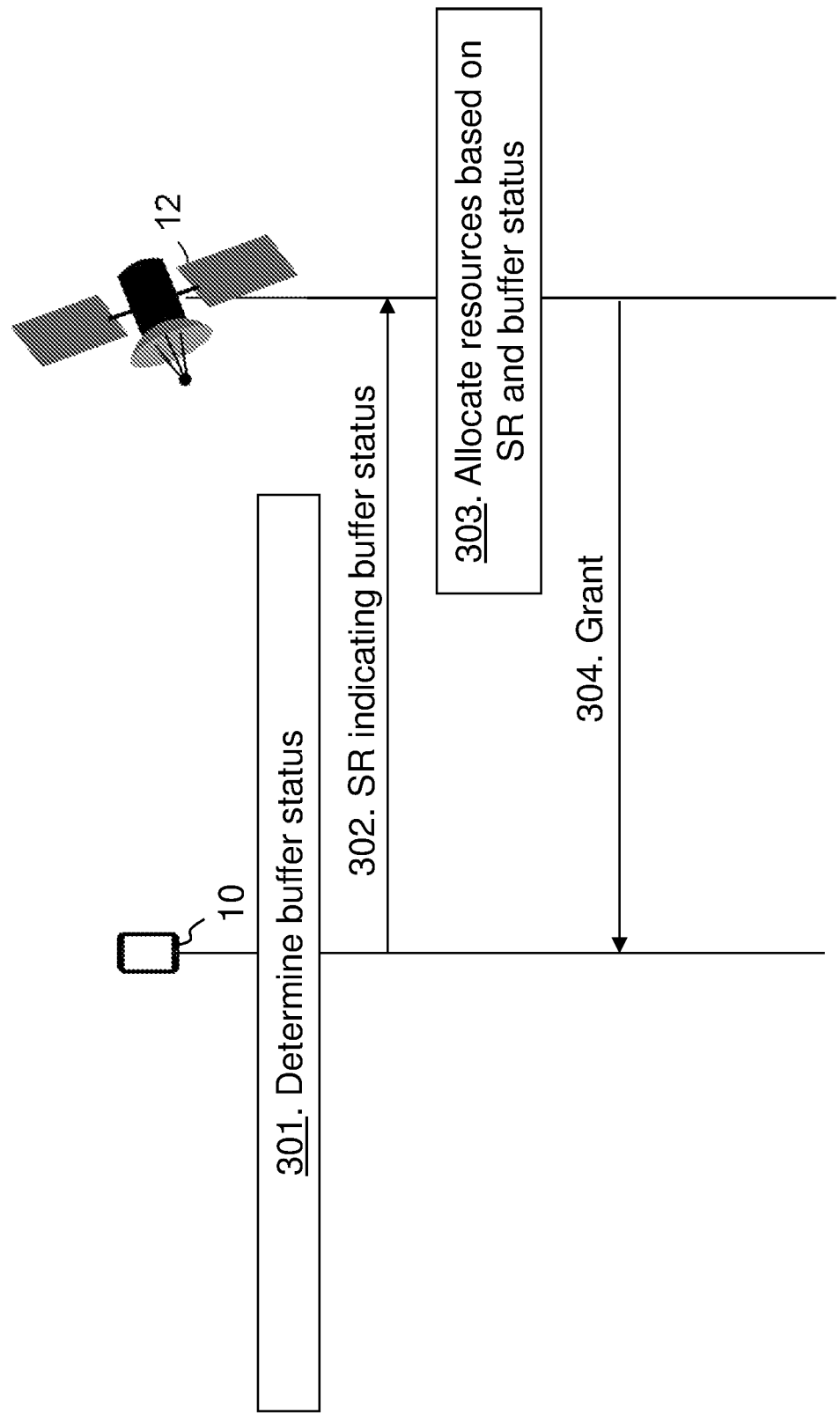
FIG. 3 is a combined flowchart and signalling scheme according to some embodiments herein.

FIG. 3 is a combined flowchart and signalling scheme according to some embodiments herein. It is herein provided a method for handling data packet transmissions e.g. managing report of buffer status of the UE 10.

Action 301. The UE 10 may determine a buffer status of a buffer for data packets present in the UE 10.

Action 302. The UE 10 transmits an SR along with an indication, e.g. one-bit, indicating the buffer status or the SR as such indicates the buffer status of the buffer. The UE 10 may thus transmit an indication associated to a buffer status when requesting resources in a scheduling request. Alternatively or additionally, the SR itself may be associated with a buffer status. For example, the UE 10 may indicate buffer status by using different SR resource allocations in time and frequency. I.e. multiple consecutive SR occasion or positions in time domain can be combined to form multiple bits carrying more information. For example, for single bit based PUCCH SR, two consecutive SR occasions or positions may be able to represent the codeword '11','10','01' or '00'.

Additionally or alternatively, the UE 10 may indicate buffer status by using multiple SR resources with different cyclic shifts (CS) and/or different orthogonal covering codes (OCC) masking over PUCCH SR can be configured for a UE in the same time-frequency resource and each SR resource corresponds to a buffer size range. The UE 10 may select which SR resources to be used for PUCCH SR transmission according to its buffer status.

Additionally or alternatively, the UE 10 may be configured with a set of buffer thresholds e.g. $B_1 < B_2 < \ldots < B_N$. When the buffer thresholds are configured, buffer level indication is triggered with SR.

Additionally or alternatively, the UE 10 may convey the buffer levels using different PUCCH sequence group numbers u and sequence numbers v within the group.

In addition or instead of SR indicating buffer level or logical channel group, one of the different SR types presented in previous embodiments can indicate SR for semi-persistent scheduling (SPS-SR). This is sent by UE 10 when it has traffic that would be well served by SPS grant, for example if the UE 10 has e.g. a parcel to be tracked while transport. Or there is other reason to ask for SPS-RS.

In another embodiment a new QoS Class Identifier (QCI) class is introduced to support e.g. the parcel tracking use case while in transport or other service over NTN. In the below table example QCI values are given.

| QCI | Resource Type | Priority Level | Packet Delay Budget (NOTE 13) | Packet Error Loss Rate (NOTE 2) | Example Services |
|---|---|---|---|---|---|
| Y | GBR | 2 | 500 ms | $10^{-2}$ | |
| Z | | 4 | 1000 ms | $10^{-3}$ | the parcel tracking while in transport |

The UE 10 may be configured with two different SR-resources. One primary SR-resource which is to be considered reliable and another secondary SR-resource which is contentious. Since the secondary SR-resource is contentious the secondary SR-resource may collide with other SR-allocations of other UEs, and then the network may rely on the probability of many UEs sending SR in close proximity and having small buffers.

Action 303. The network node 12 may then allocate resources such as time and/or frequency based on the SR and the indicated buffer status.

Action 304. The network node 12 may then transmit a grant for the allocated resources to the UE 10.

Figure 4:
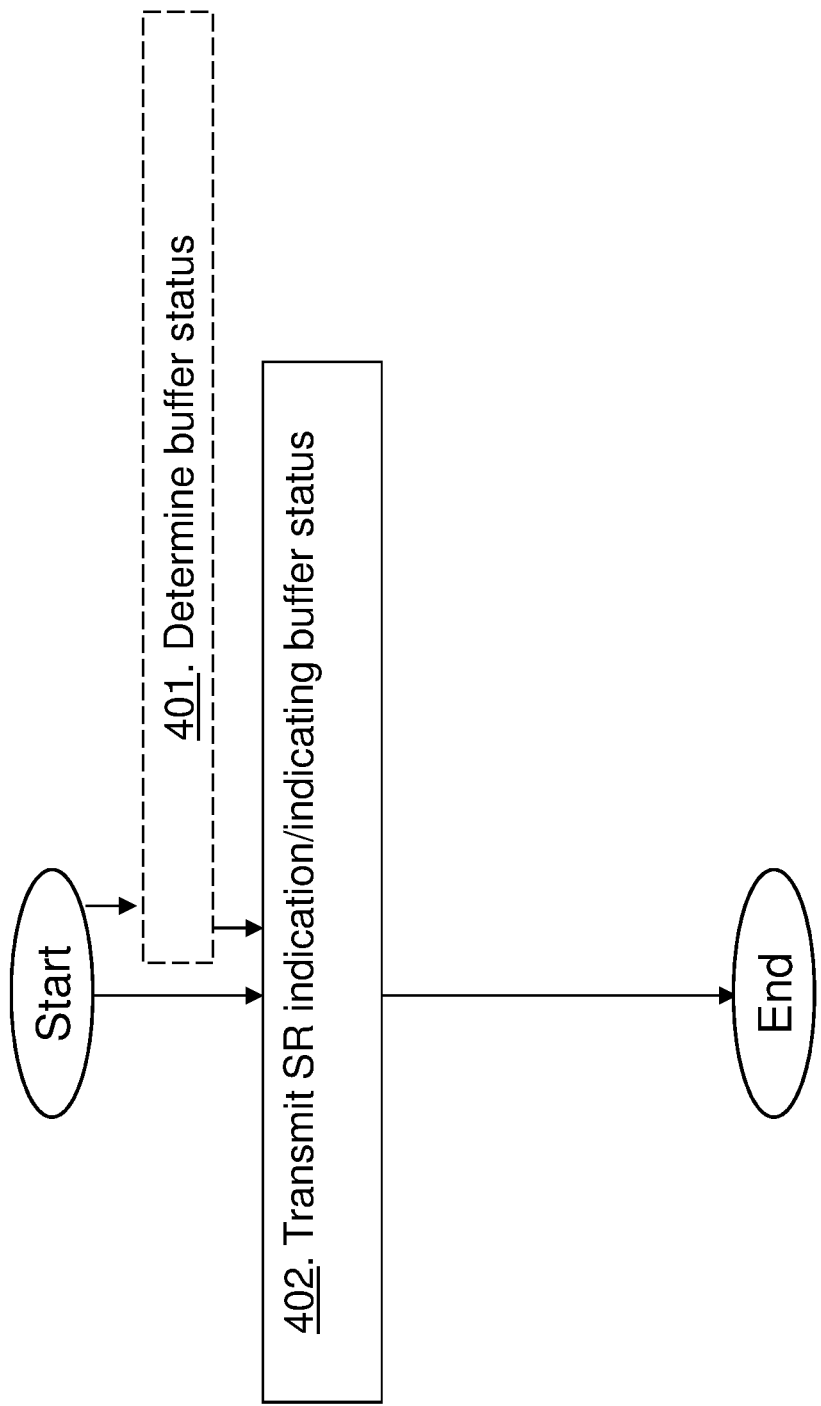
FIG. 4 is a schematic flowchart depicting a method performed by a UE according to embodiments herein.

The method actions performed by the UE 10 for handling communication of data in the wireless communication network 1 according to embodiments will now be described with reference to a flowchart depicted in FIG. 4. Actions performed in some embodiments are marked with dashed boxes.

Action 401. The UE 10 may determine the buffer status of the UE 10. Action 402. The UE 10 transmits, to the network node 12, the SR indicating the buffer status of the UE 10 or along with the indication indicating the buffer status of the UE 10. E.g. the UE may transmit the SR with the indication in a message or may transmit the SR indicating the determined buffer status of the buffer in the UE 10, e.g. using a certain sequence, frequency or time for the SR. The SR may thus indicate the buffer status by itself and/or the SR may comprise one or more bits indicating the buffer status i.e. along with. E.g. the transmitted SR may carry information of one or more bits indicating the buffer status. The buffer status may be indicating a level of the buffer, e.g. high, medium, or low. The level of the buffer may be conveyed using different PUCCH sequence group numbers u and sequence numbers v within the group. The buffer status may be indicated by using different SR resource allocations in time and frequency. The buffer status may be indicated by using one or multiple SR resources with values of different cyclic shifts and/or different orthogonal covering codes masking over PUCCH SR. The values of different cyclic shifts masking PUCCH SR may depend on a number of buffer thresholds configured for the UE 10, e.g. the value of cyclic shifts used may depend on the number of thresholds $B\_1 < B\_2 < \ldots < B\_N$ configured to the UE 10. Thus, a single SR may indicate the buffer status and/or the different level of the buffer may be indicated using different cyclic shifts.

In some embodiments, the SR may indicate buffer status by using different SR resource allocations in time and frequency. I.e. multiple consecutive SR occasions and/or positions in time domain can be combined to form multiple bits carrying more information. For example, for single bit based PUCCH SR, two consecutive SR occasions and/or positions may be able to represent the codeword '11','10', '01' or '00'.

Figure 5A:
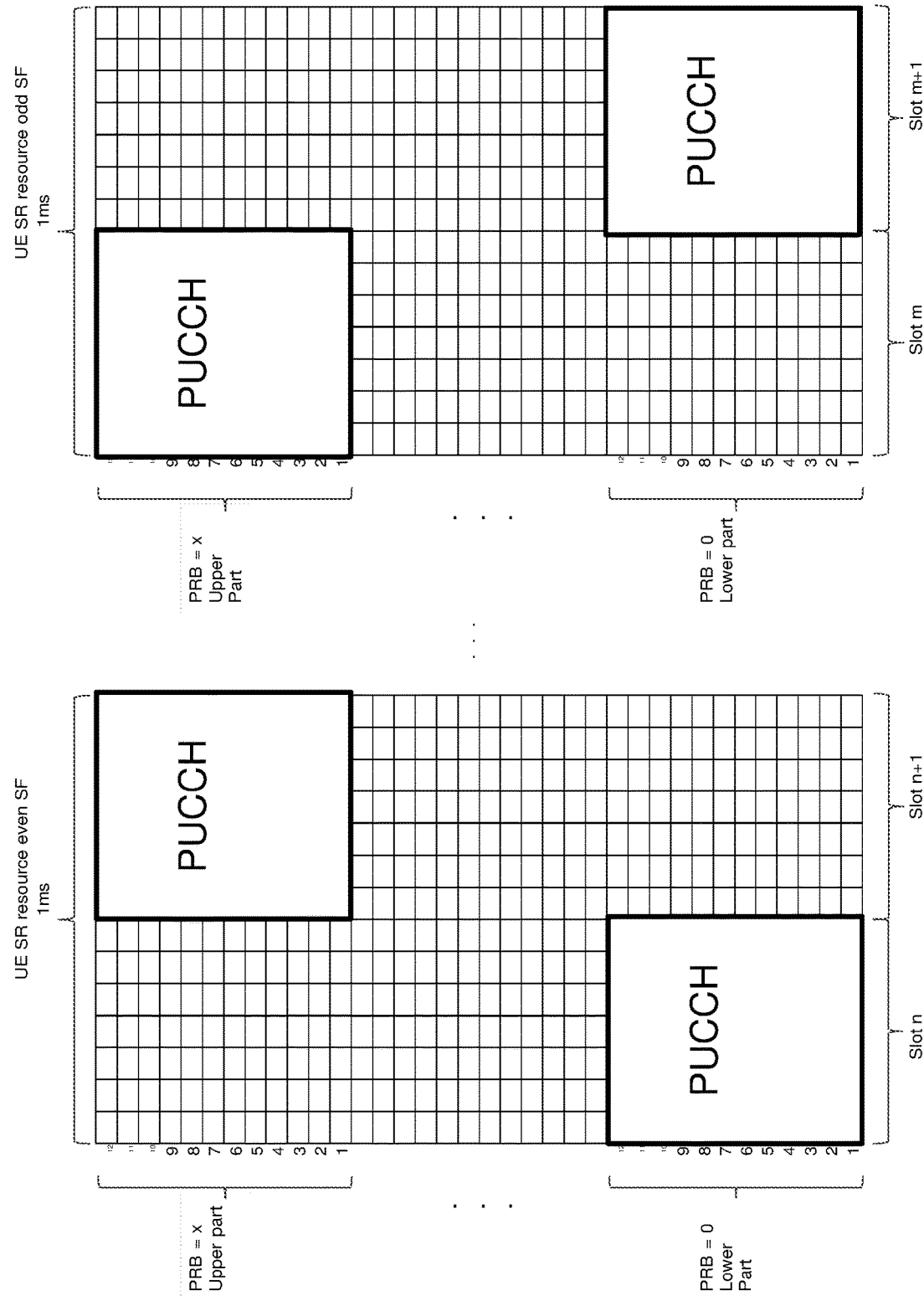
FIG. 5A is illustrating resources used according to embodiments herein.

Example: The PUCCH resources used for SR may typically be allocated at the outermost physical resource blocks (PRB) separated in both time and frequency during one slot, see e.g. left part of FIG. 5A. In one example, the buffer level can be indicated via the SR opportunities or positions in time domain. E.g. SR positions in even slots means that the buffer level is less than X bytes, and SR positions in odd slots means that the buffer level is equal to or larger than X bytes, see FIG. 5A. In another example, the buffer level can be indicated via the SR opportunities or positions in frequency domain e.g. PUCCH SR resource 1 (in frequency domain) means that the buffer level is less than X bytes and PUCCH SR resource 2 (in frequency domain) means that the buffer level is equal to or larger than X bytes.

In another example, the UE 10 may be allocated with N PUCCH allocations with the same periodicity but at different offset, which would correspond to N or 2 to the power of N buffer levels.

In existing 3GPP specifications, an SR configuration consists of a set of PUCCH resources for SR across different BWPs and cells. For a logical channel, at most one PUCCH resource for SR is configured per BWP. Each logical channel may be mapped to zero or one SR configuration. In this embodiment, the spec may need to be updated to allow a logical channel to be configured with more than one PUCCH resource per BWP. In another option, a logical channel is allowed to be associated with more than one SR configuration where each SR configuration contains only at most one PUCCH resource for SR per BWP.

In 3GPP TS 38.331 v15.3.0, a single 'schedulingRequestID' is included as part of the LogicalChannelConfig information element (IE). As discussed above, this implies that each logical channel, whose logical channel parameters are configured via the LogicalChannelConfig IE, has at most one PUCCH resource for SR (with ID given by scheduling RequestID) configured per BWP. In order to allow a logical channel to be configured with more than one PUCCH resource per BWP, a list of scheduling RequestIDs may need to be introduced in the LogicalChannelConfig as shown below:

scheduling RequestIDList SEQUENCE (SIZE (1 . . . max_scheduling RequestIDs)) OF Scheduling RequestId In the above example, scheduling RequestIDList contains the multiple PUCCH SR resources configured to a single logical channel. The number of desired buffer levels can be RRC configured via setting the size of 'schedulingRequestIDList'. The maximum number of buffer levels can also be defined by defining the maximum number of PUCCH SR resources that can be associated with a single logical channel, which is given by max_scheduling RequestIDs.

In a follow-up embodiment, in one and the same SR occasion or position in the slot, the UE 10 may choose by using any combination of the PUCCH resources as lower-upper, upper-lower, lower-lower or upper-upper, i.e., PUCCH resource allocation in both time and frequency for signaling buffer level. This would allow the UE 10 to indicate four buffer levels to the network node 12 and at the same time decrease the delay, but it would also increase the complexity of SR decoding. This method may also mean that the UE has to support parallel PUCCH-SR transmissions using multiple PUCCH-SR resources. In the existing spec, parallel PUCCH-SR transmissions, e.g. in single CC/BWP, are not allowed. This may need to be introduced accordingly. At the same time, rules on how to split UE power among PUCCH-SR resources may be defined accordingly.

In a follow-up embodiment, physical random access channel (PRACH) resources, e.g., for a random access scheduling request (RA-SR), may be used together with PUCCH-SR resources to form more bits indicating different buffer levels. For example, a set of PRACH resources, e.g. time, frequency, and/or code, are reserved for this purpose. One additional bit may be conveyed by selecting the PRACH resources vs PUCCH resources for SR. Similar as above embodiment, the existing spec may need to be updated to allow parallel transmissions between PUCCH-SR and RA-SR, e.g. in single CC/BWP, that is not possible in the existing spec.

In yet another embodiment, any of the above embodiments is applicable to both single bit based PUCCH SR and multiple-bits PUCCH SR.

In another embodiment, buffer size level corresponds to a PUCCH SR resource that may be explicitly configured using an entry index of a Rel-15 buffer size level mapping table (e.g. TS 36.321 version 15.0.0 Table 6.1.3.1-1 or Table 6.1.3.1-2).

Additionally or alternatively, multiple SR resources with different cyclic shifts (CS) and/or different orthogonal covering codes masking over PUCCH SR can be configured for the UE 10 in the same time-frequency resource and each SR resource corresponds to a buffer size range. The UE 10 may then select which SR resources to be used for PUCCH SR transmission according to its buffer status.

Additionally or alternatively, a set of buffer thresholds are introduced: $B_1 < B_2 < \ldots < B_N$. When the buffer thresholds are configured, buffer level indication is triggered with the SR.

The UE 10 may transmit a PUCCH in the PUCCH resource for the corresponding SR configuration only when the UE 10 transmits a positive SR.

For SR transmission using PUCCH format 0, a number e.g. up to 3 buffer thresholds may be configured.
Case 1: buffer thresholds are not provided
The sequence cyclic shift $m_{cs}$ is set to 0
Case 2: 1 buffer threshold is provided
The sequence cyclic shift $m_{cs}$ is set to 0 if the buffer level $x<B_1$
The sequence cyclic shift $m_{cs}$ is set to 6 if the buffer level $x \geq B_1$.
Case 3: 2 buffer thresholds are provided
The sequence cyclic shift $m_{cs}$ is set to 0 if the buffer level $x<B_1$.
The sequence cyclic shift $m_{cs}$ is set to 4 if the buffer level $B_1 \leq x \leq B_2$.
The sequence cyclic shift $m_{cs}$ is set to 8 if the buffer level $x \geq B_2$.
Case 3: 3 buffer thresholds are provided
The sequence cyclic shift $m_{cs}$ is set to 0 if the buffer level $x<B_1$.
The sequence cyclic shift $m_{cs}$ is set to 3 if the buffer level $B_1 \leq x<B_2$.
The sequence cyclic shift $m_{cs}$ is set to 6 if the buffer level $B_2 \leq x<B_3$.
The sequence cyclic shift $m_{cs}$ is set to 9 if the buffer level $x \geq B_3$.
For SR transmission using PUCCH format 1, a number e.g. up to 3 buffer thresholds may be configured.
Case 1: buffer thresholds are not provided
The information bit b(0) is set to 0
Case 2: 1 buffer threshold is provided
The information bit b(0) is set to 0 if the buffer level $x<B_1$
The information bit b(0) is set to 1 if the buffer level $x \geq B_1$.
Case 3: 2 buffer thresholds are provided
The information bits [b(0), b(1)] are set to "00" if the buffer level $x<B_1$.
The information bits [b(0), b(1)] are set to "01" if the buffer level $B_1 \leq x<B_2$.
The information bits [b(0), b(1)] are set to "10" if the buffer level $x \geq B_2$.
Case 3: 3 buffer thresholds are provided
The information bits [b(0), b(1)] are set to "00" if the buffer level $x<B_1$.
The information bits [b(0), b(1)] are set to "01" if the buffer level $B_1 \leq x<B_2$.
The information bits [b(0), b(1)] are set to "10" if the buffer level $B_2 \leq x<B_3$.
The information bits [b(0), b(1)] are set to "11" if the buffer level $x \geq B_3$.
For SR transmission using PUCCH format 2 or 3 or 4, the number of buffer thresholds may be configured up to the maximum number of UCI bits that can be transmitted with PUCCH format 2 or 3 or 4 in the corresponding PUCCH resource. The information bits may be denoted as $[b_0, \ldots, b_{\lceil log_2 N \rceil}]$, and they correspond the i-th buffer level region $[B_i, B_{i+1})$, where $i=2^{b_0 \cdots b_{\lceil log_2 N \rceil}}$. Here $B_0=0$, $B_{N+1}=+\infty$.

In another embodiment, the SR reporting is performed with HARQ-ACK. In the following, the UE 10 may be configured to transmit PUCCHs for respective SRs in a slot with SR transmission occasions that would overlap with a transmission of a PUCCH with HARQ-ACK information from the UE in the slot.

In one example, SR transmission and HARQ-ACK do not multiplex, and SR transmission is performed as in Embodiment above with only SR.

In another example, SR transmission and HARQ-ACK are multiplexed.
For SR transmission using PUCCH format 0 with HARQ-ACK
If HARQ-ACK is 1 bit, up to 1 buffer threshold can be provided. In case of positive SR,
If HARQ-ACK is "0" and the buffer level $x<B_1$
The sequence cyclic shift $m_{cs}$ is set to 1
If HARQ-ACK is "0" and the buffer level $x \geq B_1$.
The sequence cyclic shift $m_{cs}$ is set to 4
If HARQ-ACK is "1" and the buffer level $x<B_1$
The sequence cyclic shift $m_{cs}$ is set to 7
If HARQ-ACK is "1" and the buffer level $x \geq B_1$.
The sequence cyclic shift $m_{cs}$ is set to 10
If HARQ-ACK is 2 bits, buffer level indication is not signaled using the sequence cyclic shift $m_{cs}$. The existing multiplexing design is reused, i.e., additional π/12 phase rotation in case of positive SR and no additional phase rotation in case of negative SR
For SR transmission using PUCCH format 1 with HARQ-ACK
If the UE 10 transmits a positive SR in a first resource using PUCCH format 1 and at most two HARQ-ACK information bits in a second resource using PUCCH format 1 in a slot, the UE 10 may transmit a PUCCH with HARQ-ACK information bits in the first resource using PUCCH format 1.
If PUCCH format 1 carries 1 bit, it is used for 1-bit HARQ-ACK and buffer level indication is not signaled
If HARQ-ACK is 1 bit and PUCCH format 1 carries 2 bits, up to 1 buffer threshold can be provided and the remaining bit can be used to signal the buffer level
If HARQ-ACK are 2 bits and PUCCH format 1 carries 2 bits, buffer level indication is not signaled
For SR transmission using PUCCH format 2/3/4 with HARQ-ACK
The UE may append SR bits representing a negative or a positive SR and the associated buffer level indication bits, in ascending order of the values of schedulingRequestResourceId, to the HARQ-ACK information bits and the UE 10 may transmit the combined UCI bits in a PUCCH.
using a resource with PUCCH format 2 or PUCCH format 3 or PUCCH format 4 for transmission of HARQ-ACK information.

In another example, SR is reported with CSI. In the following, the UE 10 may be configured to transmit PUCCHs for respective SRs in a slot with SR transmission occasions that would overlap with a transmission of a PUCCH with periodic/semi persistent CSI transmission from the UE in the slot.

In one example, SR transmission and CSI are not multiplexed, and the SR transmission is performed as in the embodiment above with only SR reporting.

In another example, SR transmission and CSI are multiplexed.
If the UE 10 transmits a PUCCH with periodic/semi-persistent CSI in a resource using PUCCH format 2 or PUCCH format 3 or PUCCH format 4 in a slot, the UE may append SR bits representing negative or positive SR and the associated buffer level indication bits, in ascending order of the values of schedulingRequestResourceId, to the periodic/semi-persistent CSI information bits. The UE 10 may transmit a PUCCH with the combined UCI bits in a resource using the PUCCH format 2 or PUCCH format 3 or PUCCH format 4 for CSI reporting.

In another example, SR is reported with HARQ-ACK and CSI. In the existing NR design, the UE 10 multiplexes HARQ-ACK, with or without SR, and periodic/semi-persistent CSI in a same PUCCH if the UE 10 is provided higher layer parameter simultaneousHARQ-ACK-CSI; otherwise, the UE 10 drops the periodic/semi-persistent CSI report(s) and includes only HARQ-ACK, with or without SR, in the PUCCH.

If CSI is dropped, SR reporting with HARQ-ACK can be according to Embodiment above.

If CSI is not dropped, the reporting in the PUCCH format 2 or PUCCH format 3 or PUCCH format 4 may include buffer level indication bits in addition to SR bits, HARQ-ACK, and CSI bits.

In one example, the buffer level indication bits and SR bits together form a larger set of "SR bits" and then multiplexed with HARQ-ACK and CSI bits using existing multiplexing scheme, i.e., buffer level indication bits may be treated with the same priority as SR bits in the multiplexing.

In another example, the buffer level indication bits, SR bits, HARQ-ACK and CSI bits are multiplexed using a new scheme, where the buffer level indication bits are treated with a different priority (e.g. lower priority) as SR bits in the multiplexing.

Additionally or alternatively, the UE 10 may convey the buffer levels using different PUCCH sequence group numbers u and sequence numbers v within the group.

In one example, a number of sequence groups e.g. 30 sequence groups may be divided into N subgroups where each subgroup is associated with a different buffer level. For instance, if N=3, then the $i^{th}$ subgroup (i=1,2,3) contains group number $u_i=\{(i-1)*10+1, (i-1)*10+2, \ldots, (i-1)*10+10\}$ corresponds to the $i^{th}$ buffer level. Hence, when the UE 10 transmits SR in a PUCCH resource using a sequence belonging to the $i^{th}$ subgroup, then the network node 12 knows that that the UE's buffer status is at the $i^{th}$ buffer level.

In some other examples, the sequence subgroup may contain a single group number. For instance, N=3 subgroups can be defined where the $i^{th}$ subgroup (i=1,2,3) contains group number $u_i=\{i\}$ corresponds to the $i^{th}$ buffer level.

In addition or instead of the SR indicating buffer level or logical channel group, one of the different SR types presented in previous embodiments may indicate SR for semi-persistent scheduling (SPS-SR). This may be sent by the UE 10 when it has traffic that would be well served by SPS grant, for example if the UE 10 has e.g. a parcel to be tracked while being in transport. Or there is other reason to ask for SPS-RS.

Another embodiment introduces a new QCI class to support e.g. the parcel tracking use case while in transport or other service over NTN. In the below table example QCI values are given.

| QCI | Resource Type | Priority Level | Packet Delay Budget (NOTE 13) | Packet Error Loss Rate (NOTE 2) | Example Services |
|---|---|---|---|---|---|
| Y |  | 2 | 500 ms | $10^{-2}$ |  |
| Z | GBR | 4 | 1000 ms | $10^{-3}$ | the parcel tracking while in transport |

Figure 5B:
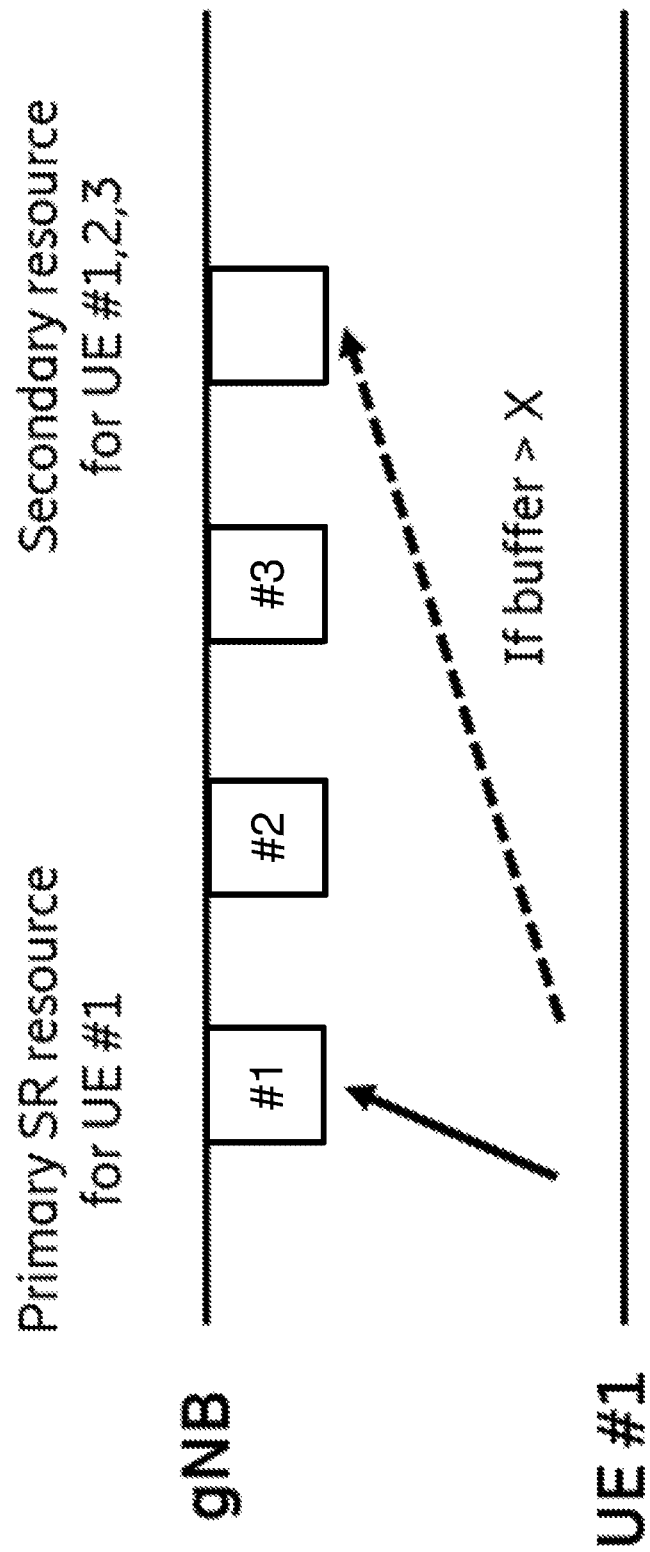
FIG. 5B shows primary and secondary/contentious SR resources.

Additionally or alternatively, the UE 10 may be configured with two different SR-resources, one primary SR-resource which is to be considered reliable and another secondary SR which is contentious and may collide with other SR-allocations of other UEs, where the network would rely on the probability of many UEs sending SR in close proximity and having large buffers to be small, see FIG. 5B.

If the UE 10 is configured with one or a set of thresholds, the UE may only utilize the first SR-resource whenever the buffer is smaller than a certain threshold, and then utilize the secondary SR-resource whenever the buffer is larger than the threshold. The SR-resource may be independent such that if only the first and more reliable SR-resource is detected then the UE might still receive a grant as the normal case.

Figure 5C:
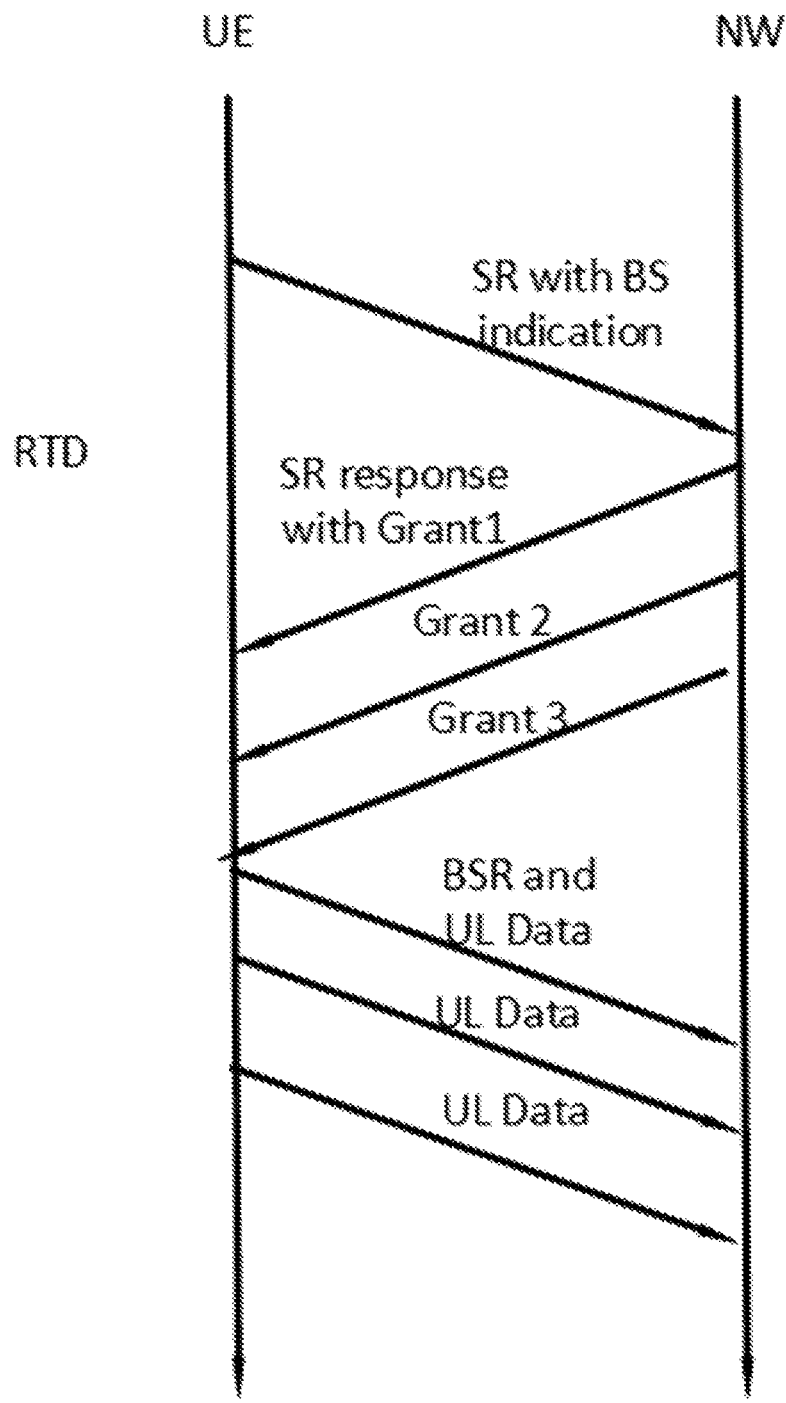
FIG. 5C is a signalling scheme according to some embodiments herein.

FIG. 5C is a signalling scheme according to embodiments herein. From FIG. 5C it is illustrated that according to embodiments herein the delay is reduced and the resource efficiency of the scheduler is increased by indicating buffer status as early as possible.

Figure 6:
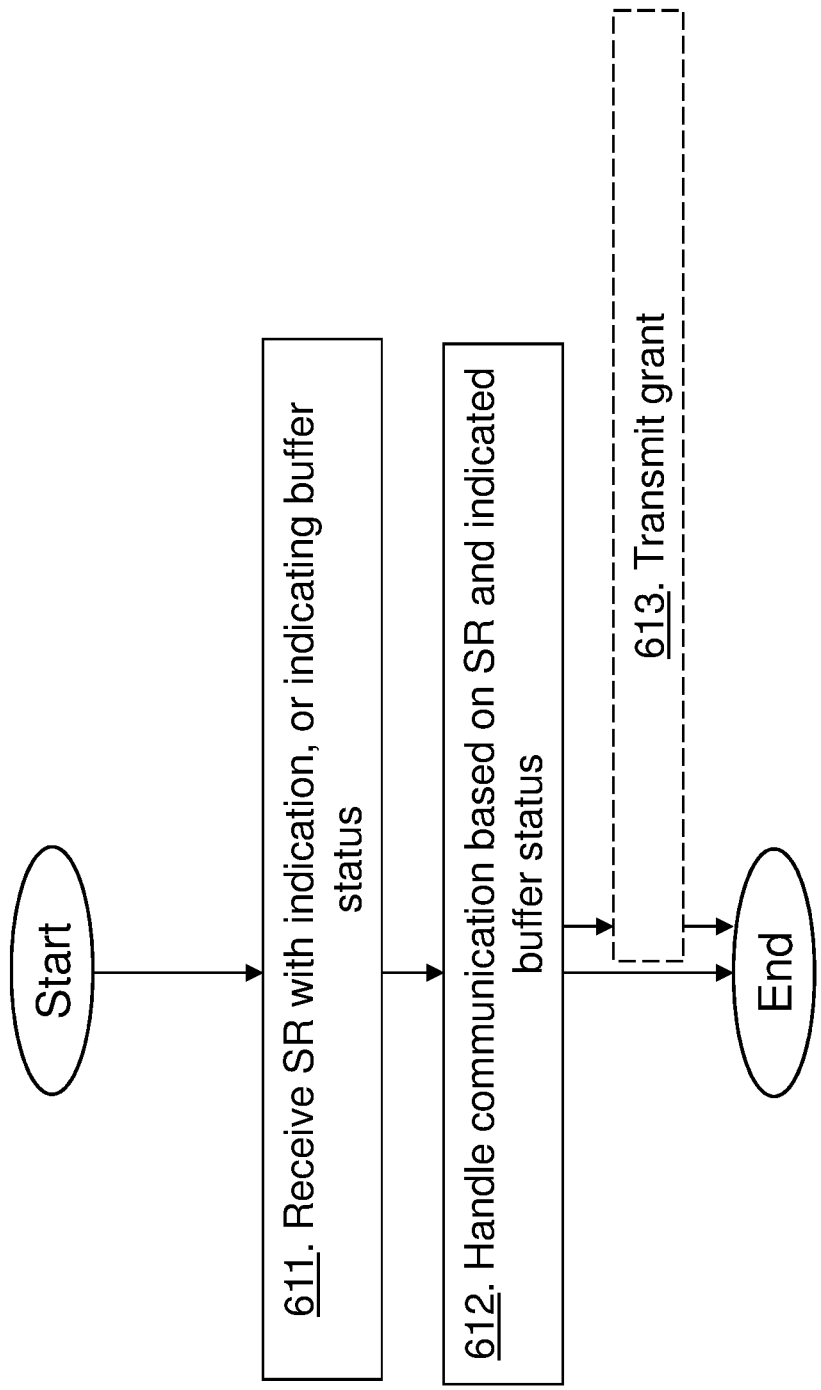
FIG. 6 is a schematic flowchart depicting a method performed by a network node according to embodiments herein.

The method actions performed by the network node for handling communication of data of the UE 10 in the wireless communication network 1 according to embodiments will now be described with reference to a flowchart depicted in FIG. 6. Actions performed in some embodiments are marked with dashed boxes.

Action 611. The network node 12 receives the SR indicating the buffer status of the UE 10 or along with the indication indicating the buffer status of the UE. The network node 12 may thus receive the indication associated to the buffer status in the scheduling request. The SR may be associated with the buffer status. The SR may indicate the buffer status by itself, and/or the SR may comprise one or more bits indicating the buffer status. The buffer status may indicate the level of buffer. The level of the buffer may be conveyed using different PUCCH sequence group numbers u and sequence numbers v within the group. The buffer status may be indicated by using different SR resource allocations in time and frequency. The buffer status may be indicated by using one or more multiple SR resources with values of different cyclic shifts and/or different orthogonal covering codes masking over PUCCH SR. The values of different cyclic shifts masking PUCCH SR may depend on the number of buffer thresholds configured for the UE 10.

For example, the network node 12 may receive an indication indicating the buffer status by using different SR resource allocations in time and frequency. I.e. multiple consecutive SR occasion/positions in time domain can be combined to form multiple bits carrying more information. For example, for single bit based PUCCH SR, two consecutive SR occasion/positions may be able to represent the codeword '11','10','01' or '00'.

Additionally or alternatively, the network node 12 may receive an indication indicating buffer status by using multiple SR resources with different cyclic shifts (CS) and/or different orthogonal covering codes (OCC) masking over PUCCH SR can be configured for a UE in the same time-frequency resource and each SR resource corresponds to a buffer size range. SR resources may thus be used for PUCCH SR transmission according to buffer status of the network node 12.

Additionally or alternatively, the network node 12 may configure the UE 10 with a set of buffer thresholds e.g. $B_1<B_2<\ldots<B_N$. When the buffer thresholds are configured, buffer level indication is triggered with SR.

Additionally or alternatively, the network node 12 may receive the buffer levels using different PUCCH sequence group numbers u and sequence numbers v within the group.

In addition or instead of SR indicating buffer level or logical channel group, one of the different SR types presented in previous embodiments can indicate SR for semi persistent scheduling (SPS-SR).

In another embodiment is it introduced new QoS Class Identifier (QCI) class to support e.g. the parcel tracking use case while in transport or other service over NTN.

Action 612. The network node 12 further handles communication of the UE e.g. allocates resources, generates a grant, based on the SR and the indicated buffer status of the UE 10. E.g. the network node 12 may grant resources based on the SR and the indicated buffer status.

Action 613. According to some embodiments the network node 12 may then transmit a grant for the allocated resources to the UE 10.

Figure 7A:
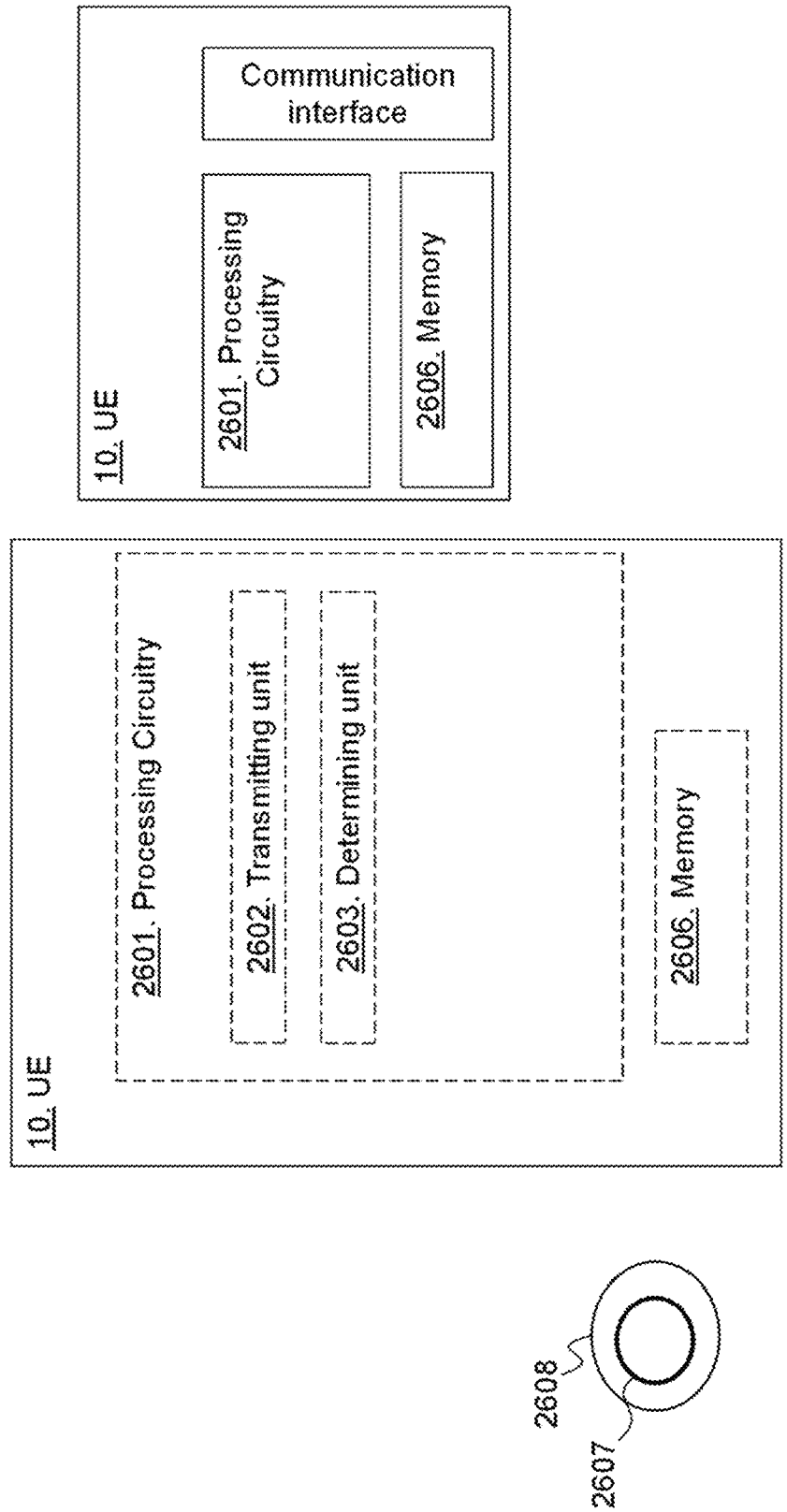
FIG. 7A is a block diagram depicting a UE according to embodiments herein.

FIG. 7A is a block diagram depicting the UE 10 in two embodiments for handling communication of data of the UE 10 in the communication network.

The UE 10 may comprise processing circuitry 2601, e.g. one or more processors, configured to perform the methods herein.

The UE 10 may comprise a determining unit 2602. The UE 10, the processing circuitry 2601, and/or the determining unit 2602 may be configured to determine the buffer status of the UE 10.

The UE 10 may comprise a transmitting unit 2603. The UE 10, the processing circuitry 2601, and/or the transmitting unit 2603 is configured to transmit, to the network node 12, the SR indicating the buffer status of the UE 10 or along with the indication indicating the buffer status of the UE 10, e.g. the SR may indicate the buffer status by itself or the SR may comprise one or more bits indicating the buffer status such as the level of buffer. The UE 10, the processing circuitry 2601, and/or the transmitting unit 2603 may be configured to convey the level of the buffer using different PUCCH sequence group numbers u and sequence numbers v within the group. The buffer status may be indicated by using different SR resource allocations in time and frequency. The buffer status may be indicated by using one or multiple SR resources with values of different cyclic shifts and/or different orthogonal covering codes masking over PUCCH SR. The values of different cyclic shifts masking PUCCH SR may depend on the number of buffer thresholds configured for the UE 10.

The UE 10 further comprises a memory 2606. The memory comprises one or more units to be used to store data on, such as applications to perform the methods disclosed herein when being executed, and similar.

The UE 10 may further comprise a communication interface such as transmitter, receiver, transceiver and/or one or more antennas.

The methods according to the embodiments described herein for the UE 10 are respectively implemented by means of e.g. a computer program product 2607 or a computer program, comprising instructions, i.e., software code portions, which, when executed on at least one processor, cause the at least one processor to carry out the actions described herein, as performed by the UE 10. The computer program product 2607 may be stored on a computer-readable storage medium 2608, e.g. a disc, a universal serial bus (USB) stick or similar. The computer-readable storage medium 2608, having stored thereon the computer program product, may comprise the instructions which, when executed on at least one processor, cause the at least one processor to carry out the actions described herein, as performed by the UE 10. In some embodiments, the computer-readable storage medium may be a transitory or a non-transitory computer-readable storage medium. Thus, the UE 10 may comprise the processing circuitry and the memory, said memory comprising instructions executable by said processing circuitry whereby said UE 10 is operative to perform the methods herein.

Figure 7B:
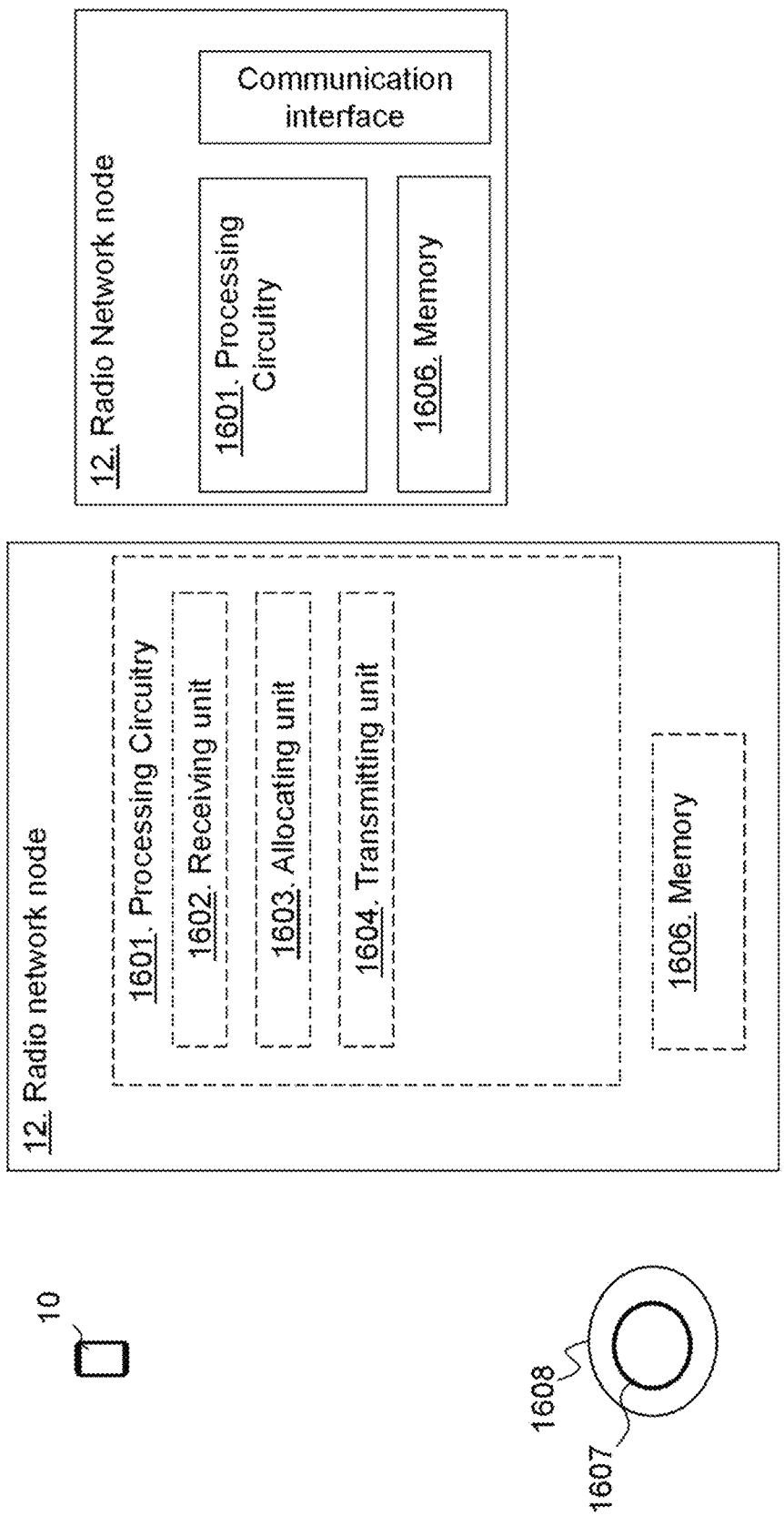
FIG. 7B is a block diagram depicting a network node according to embodiments herein.

FIG. 7B is a block diagram depicting the network node 12 in two embodiments for handling communication of data of the UE 10 in the wireless communication network.

The network node 12 may comprise processing circuitry 1601, e.g. one or more processors configured to perform the methods herein.

The network node 12 may comprise a receiving unit 1602, e.g. a receiver or transceiver. The radio network node 12, the processing circuitry 1601, and/or the receiving unit 1602 is configured to receive, from the UE, the SR indicating the buffer status of the UE 10 or along with the indication indicating the buffer status of the UE, e.g. the SR may indicate the buffer status by itself or the SR may comprise one or more bits indicating the buffer status such as the level of buffer. The level of the buffer may be conveyed using different PUCCH sequence group numbers u and sequence numbers v within the group. The buffer status may be indicated by using different SR resource allocations in time and frequency. The buffer status may be indicated by using one or multiple SR resources with values of different cyclic shifts and/or different orthogonal covering codes masking over PUCCH SR. The values of different cyclic shifts masking PUCCH SR may depend on a number of buffer thresholds configured for the UE 10.

The network node 12 may comprise an allocating unit 1603, e.g. a scheduler or allocator. The radio network node 12, the processing circuitry 1601, and/or the allocating unit 1603 may be configured to handle communication of the UE based on the SR and the indicated buffer status, e.g. to allocate resources based on the SR and the indicated buffer status of the UE 10 thus, granting resources based on the SR and the indicated buffer status.

The network node 12 may comprise a transmitting unit 1604, e.g. a transmitter or a transceiver. The radio network node 12, the processing circuitry 1601, and/or the transmitting unit 1604 may be configured to transmit a grant for the allocated resources to the UE 10.

The network node 12 further comprises a memory 1606. The memory comprises one or more units to be used to store data on, such as resources, grants, BSRs, applications to perform the methods disclosed herein when being executed, and similar. The network node 12 may further comprise a communication interface such as transmitter, receiver, transceiver and/or one or more antennas.

The methods according to the embodiments described herein for the network node 12 are respectively implemented by means of e.g. a computer program product 1607 or a computer program, comprising instructions, i.e., software code portions, which, when executed on at least one processor, cause the at least one processor to carry out the actions described herein, as performed by the network node 12. The computer program product 1607 may be stored on a computer-readable storage medium 1608, e.g. a disc, a universal serial bus (USB) stick or similar. The computer-readable storage medium 1608, having stored thereon the computer program product, may comprise the instructions which, when executed on at least one processor, cause the at least one processor to carry out the actions described herein, as performed by the network node 12. In some embodiments, the computer-readable storage medium may be a transitory or a non-transitory computer-readable storage medium. Thus, the network node 12 may comprise the processing circuitry and the memory, said memory comprising instructions executable by said processing circuitry whereby said network node 12 is operative to perform the methods herein.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node or UE, for example.

Examples of network node is NodeB, base station (BS), multi-standard radio (MSR) radio node such as MSR BS, eNodeB, gNodeB, MeNB, SeNB, network controller, radio network controller (RNC), base station controller (BSC), road side unit (RSU), relay, donor node controlling relay, base transceiver station (BTS), access point (AP), transmission points, transmission nodes, RRU, RRH, nodes in distributed antenna system (DAS), core NN (e.g. MSC, MME etc), O&M, OSS, SON, positioning node (e.g. E-SMLC) etc.

A UE may refer to any type of wireless device communicating with a NN and/or with another UE in a cellular or mobile communication system. Examples of UE are target device, device to device (D2D) UE, V2X UE, ProSe UE, machine type UE or UE capable of machine to machine (M2M) communication, PDA, iPAD, Tablet, mobile terminals, smart phone, laptop embedded equipped (LEE), laptop mounted equipment (LME), USB dongles etc.

The term time resource used herein may correspond to any type of physical resource or radio resource expressed in terms of length of time. Examples of time resources are: symbol, time slot, subframe, radio frame, TTI, interleaving time, etc. The term frequency resource used herein may correspond to any type of physical resource or radio resource expressed in terms of span in frequency. A frequency resource need not occupy all physical resource elements in its span.

The term radio access technology, or RAT, may refer to any RAT e.g. UTRA, E-UTRA, narrow band internet of things (NB-IOT), WiFi, Bluetooth, next generation RAT (NR), 4G, 5G, etc. Any of the first and the second nodes may be capable of supporting a single or multiple RATs.

Figure 8:
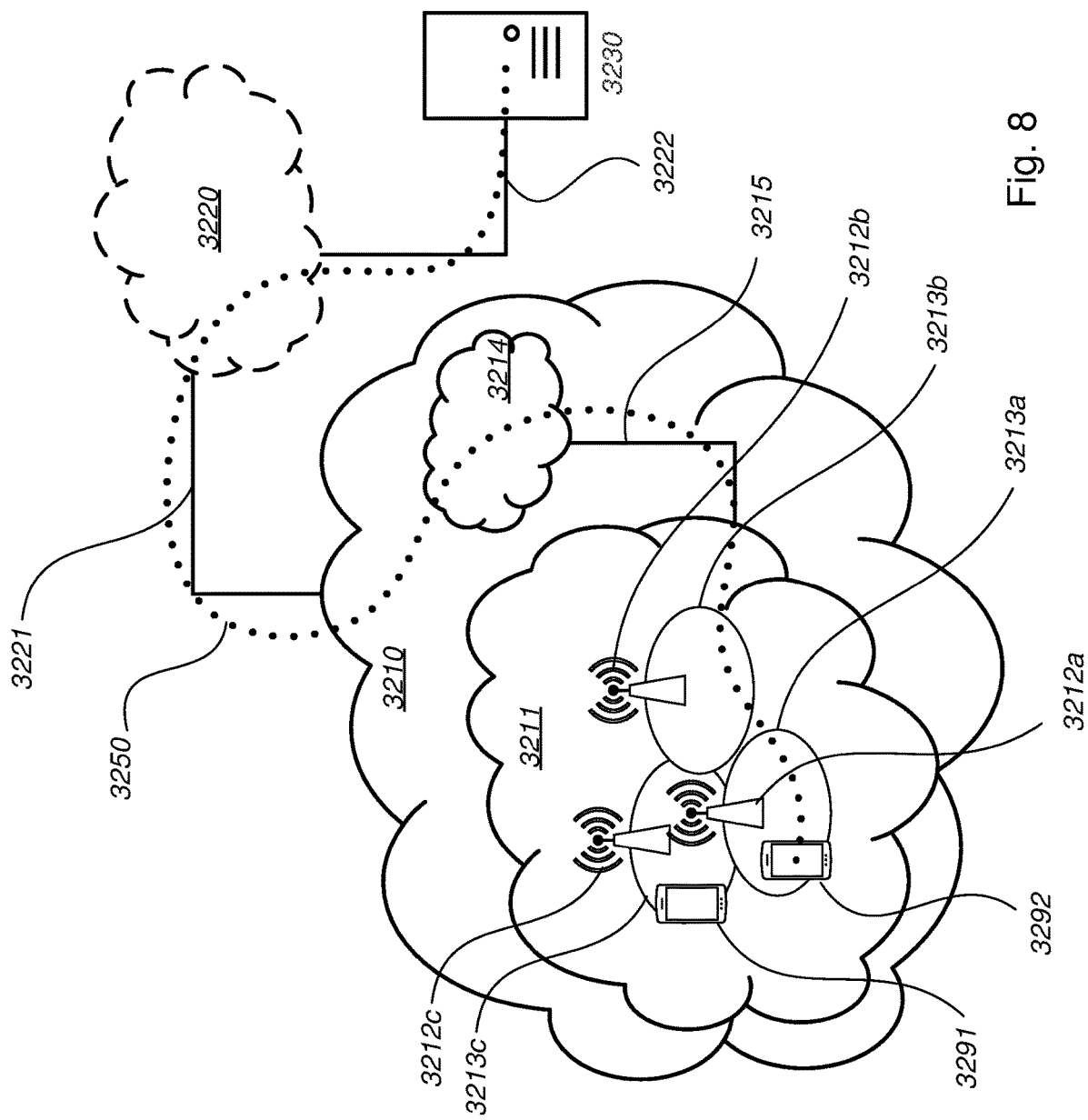
FIG. 8 shows a telecommunication network connected via an intermediate network to a host computer in accordance with some embodiments.

With reference to FIG. 8, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 9) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 9:
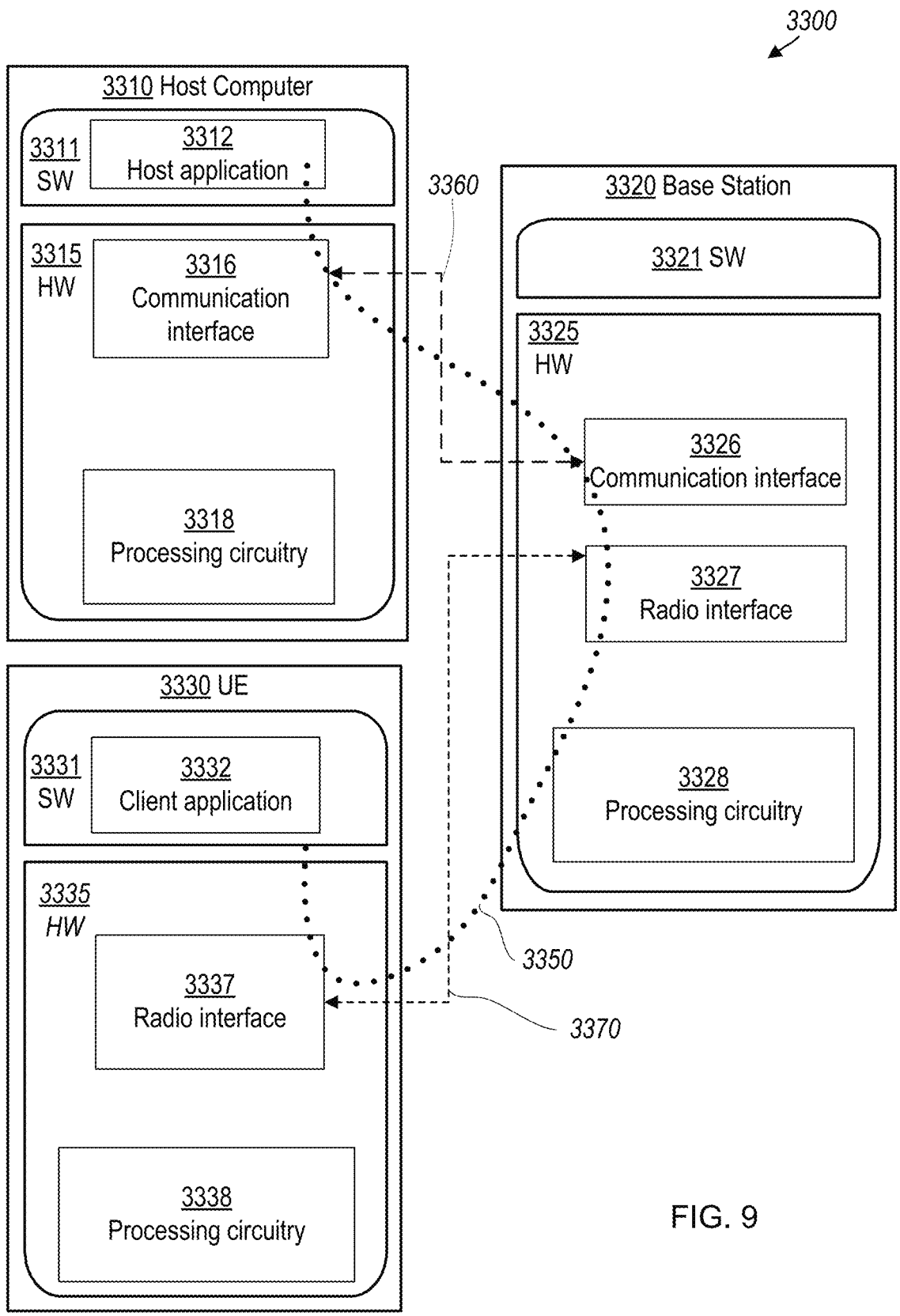
FIG. 9 shows a host computer communicating via a base station with a user equipment over a partially wireless connection in accordance with some embodiments.

It is noted that the host computer 3310, base station 3320 and UE 3330 illustrated in FIG. 9 may be identical to the host computer 3230, one of the base stations 3212a, 3212b, 3212c and one of the UEs 3291, 3292 of FIG. 8, respectively. This is to say, the inner workings of these entities may be as shown in FIG. 9 and independently, the surrounding network topology may be that of FIG. 8.

In FIG. 9, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may reduce the delay and increase the resource efficiency of the scheduler by indicating buffer status as early as possible. Thus, embodiments herein enable the network node to grant resources in an efficient manner resulting in a communication with reduced delay which leads to an improved performance of the wireless communication network.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Abbreviations

3GPP 3rd Generation Partnership Project
BS Base Station
BL/CE Bandwidth Limited/Coverage Extended
CP Cyclic Prefix
DRX Discontinuous Reception
GEO Geostationary Orbit
GPS Global Positioning System
GW Gateway
LEO Low Earth Orbit
LTE Long Term Evolution
MAC Medium Access Control
MEO Medium Earth Orbit
Msg1 Message 1
Msg2 Message 2
Msg3 Message 3
Msg4 Message 4
NGSO Non-Geostationary Orbit
NR New Radio
RTT Round-Trip Time
RRC Radio Resource Control
SI System Information
SR Scheduling Requests
TA Timing Advance
UE User Equipment
SC_PTM Single-cell point-to-multipoint
SC_MTCH Single-cell multicast traffic channel
SC_MCCH Single-cell multicast control channel
HARQ Hybrid automatic repeat request

REFERENCES

[1] TR 38.811 v15.0.0, Study on New Radio (NR) to support non-terrestrial networks
[2] RP-181370, Study on solutions evaluation for NR to support non-terrestrial Network

The invention claimed is:

1. A method performed by a user equipment, UE, for handling communication of data in a wireless communication network, the method comprising:
transmitting, to a network node, a scheduling request, SR, indicating a buffer status of the UE by using an SR resource having a value of a cyclic shift masking a physical uplink control channel, PUCCH SR, the value being selected from a plurality of values, the plurality of values being based on a number of buffer thresholds configured for the UE, the buffer status indicating a level of buffer, the level of the buffer being conveyed using different physical uplink control channel, PUCCH, sequence group numbers u and sequence numbers v within a sequence group.

2. The method according to claim 1, wherein the SR indicates the buffer status by itself.

3. The method according to claim 1, wherein the SR comprises one or more bits indicating the buffer status.

4. A method performed by a network node for handling communication of data of a user equipment, UE, in a wireless communication network, the method comprising:
   receiving, from the UE, a scheduling request, SR, indicating a buffer status of the UE by an SR resource having a value of a cyclic shift masking a physical uplink control channel, PUCCH SR, the value being selected from a plurality of values, the plurality of values being based on a number of buffer thresholds configured for the UE, the buffer status indicating a level of buffer, the level of the buffer being conveyed using different physical uplink control channel, PUCCH, sequence group numbers u and sequence numbers v within a sequence group; and
   handling communication of the UE based on the SR and the indicated buffer status.

5. The method according to claim 4, wherein the SR indicates the buffer status by itself.

6. The method according to claim 4, wherein the SR comprises one or more bits indicating the buffer status.

7. The method according to claim 4, wherein handling communication comprises granting resources based on the SR and the indicated buffer status.

8. A user equipment, UE, for handling communication of data in a wireless communication network, the UE being configured to:
   transmit, to a network node, a scheduling request, SR, indicating a buffer status of the UE by using an SR resource having a value of a cyclic shift masking a physical uplink control channel, PUCCH SR, the value being selected from a plurality of values, the plurality of values being based on a number of buffer thresholds configured for the UE, the buffer status indicating a level of buffer, the level of the buffer being conveyed using different physical uplink control channel, PUCCH, sequence group numbers u and sequence numbers v within a sequence group.

9. The UE according to claim 8, wherein the SR indicates the buffer status by itself.

10. The UE according to claim 8, wherein the SR comprises one or more bits indicating the buffer status.

11. A network node for handling communication of data of a user equipment, UE, in a wireless communication network, the network node being configured to:
   receive, from the UE, a scheduling request, SR, one of indicating a buffer status of the UE by using an SR resource having a value of a cyclic shift masking a physical uplink control channel, PUCCH SR, the value being selected from a plurality of values, the plurality of values being based on a number of buffer thresholds configured for the UE, the buffer status indicating a level of buffer, the level of the buffer being conveyed using different physical uplink control channel, PUCCH, sequence group numbers u and sequence numbers v within a sequence group; and
   handling communication of the UE based on the SR and the indicated buffer status.

12. The network node according to claim 11, wherein the SR indicates the buffer status by itself.

13. The network node according to claim 11, wherein the SR comprises one or more bits indicating the buffer status.

* * * * *